US009509968B2

(12) United States Patent
Zimmermann et al.

(10) Patent No.: US 9,509,968 B2
(45) Date of Patent: Nov. 29, 2016

(54) APPARATUS, SYSTEM, AND METHOD FOR ANNOTATION OF MEDIA FILES WITH SENSOR DATA

(75) Inventors: Roger Zimmermann, Singapore (SG); Seon Ho Kim, Engelwood, CO (US); Sakire Arslan Ay, Singapore (SG); Beomjoo Seo, Singapore (SG); Zhijie Shen, Singapore (SG); Guanfeng Wang, Singapore (SG); Jia Hao, Singapore (SG); Ying Zhang, Singapore (SG)

(73) Assignee: National University of Singapore, Singapore (SG)

( * ) Notice: Subject to any disclaimer, the term of this patent is extended or adjusted under 35 U.S.C. 154(b) by 57 days.

(21) Appl. No.: 14/000,846

(22) PCT Filed: Feb. 21, 2012

(86) PCT No.: PCT/SG2012/000051
§ 371 (c)(1),
(2), (4) Date: Aug. 21, 2013

(87) PCT Pub. No.: WO2012/115593
PCT Pub. Date: Aug. 30, 2012

(65) Prior Publication Data
US 2013/0330055 A1 Dec. 12, 2013

Related U.S. Application Data

(60) Provisional application No. 61/445,036, filed on Feb. 21, 2011.

(51) Int. Cl.
*H04N 9/79* (2006.01)
*H04N 1/00* (2006.01)
(Continued)

(52) U.S. Cl.
CPC .......... *H04N 9/79* (2013.01); *G06F 17/30817* (2013.01); *H04N 1/00127* (2013.01);
(Continued)

(58) Field of Classification Search
None
See application file for complete search history.

(56) References Cited

U.S. PATENT DOCUMENTS

| 7,881,604 | B2 | 2/2011 | Kurane | 396/429 |
| 2002/0186961 | A1* | 12/2002 | Kikuchi | G11B 19/04 386/248 |

(Continued)

OTHER PUBLICATIONS

Ay et al., "GRVS: A Georeferenced Video Search Engine", 2 pages, 17th ACM International Multimedia Conference (ACM Multimedia 2009), Beijing, China, Oct. 19-24, 2009, <http://eiger.ddns.comp.nus.edu.sg/pubs/de934-arslan.pdf>.
(Continued)

*Primary Examiner* — Eileen Adams
(74) *Attorney, Agent, or Firm* — Norton Rose Fulbright US LLP

(57) ABSTRACT

Embodiments of methods for multimedia annotation with sensor data (referred to herein as Sensor-rich video) includes acquisition, management, storage, indexing, transmission, search, and display of video, images, or sound, that has been recorded in conjunction with additional sensor information (such as, but not limited to, global positioning system information (latitude, longitude, altitude), compass directions, WiFi fingerprints, ambient lighting conditions, etc.). The collection of sensor information is acquired on a continuous basis during recording. For example, the GPS information may be continuously acquired from a corresponding sensor at every second during the recording of a video. Therefore, the acquisition apparatus generates a continuous stream of video frames and a continuous stream of sensor meta-data values. The two streams are correlated in that every video frame is associated with a set of sensor values. Note that the sampling frequency (i.e., the frequency at which sensor values can be measured) is dependent on the type of sensor. For example, a GPS sensor may be sampled at 1-second intervals while a compass sensor may be sampled at 50 millisecond intervals. Video is also sampled at a specific rate, such as 25 or 30 frames per second. Sensor data are associated with each frame. If sensor data has not changed from the previous frame (due to a low sampling rate) then the previously measured data values are used. The resulting combination of a video and a sensor stream is called a sensor-rich video.

32 Claims, 21 Drawing Sheets

(51) Int. Cl.

| | |
|---|---|
| H04N 21/2743 | (2011.01) |
| H04N 21/414 | (2011.01) |
| H04N 21/422 | (2011.01) |
| H04N 21/4223 | (2011.01) |
| H04N 21/4728 | (2011.01) |
| H04N 21/482 | (2011.01) |
| H04N 21/61 | (2011.01) |
| H04N 21/81 | (2011.01) |
| H04N 21/84 | (2011.01) |
| H04N 21/8547 | (2011.01) |
| G06F 17/30 | (2006.01) |
| G01S 5/16 | (2006.01) |
| G01S 19/14 | (2010.01) |
| G01S 19/49 | (2010.01) |
| H04N 21/845 | (2011.01) |

(52) U.S. Cl.
CPC .... *H04N21/2743* (2013.01); *H04N 21/41407* (2013.01); *H04N 21/4223* (2013.01); *H04N 21/42202* (2013.01); *H04N 21/4728* (2013.01); *H04N 21/4828* (2013.01); *H04N 21/6131* (2013.01); *H04N 21/6181* (2013.01); *H04N 21/8193* (2013.01); *H04N 21/84* (2013.01); *H04N 21/8547* (2013.01); *G01S 5/16* (2013.01); *G01S 19/14* (2013.01); *G01S 19/49* (2013.01); *H04N 21/8456* (2013.01); *H04N 2201/3253* (2013.01)

(56) References Cited

U.S. PATENT DOCUMENTS

| | | | | |
|---|---|---|---|---|
| 2005/0203430 A1* | 9/2005 | Williams | ............... | A61B 5/1117 600/513 |
| 2008/0144924 A1* | 6/2008 | Hoffmann | ............... | G06T 7/002 382/154 |
| 2009/0251533 A1 | 10/2009 | Smith et al. | ............... | 348/77 |
| 2009/0254276 A1* | 10/2009 | Faulkner | ............... | G01C 21/16 701/469 |
| 2010/0085422 A1* | 4/2010 | Yamashita | ............... | G06T 7/003 348/36 |
| 2010/0208076 A1 | 8/2010 | Kinoshita | ............... | 348/148 |

OTHER PUBLICATIONS

Ay et al., "Relevance Ranking in Georeferenced Video Search", 28 pages, *Multimedia Systems Journal*, vol. 16, Issue 2, Published online Feb. 9, 2010.

Ay et al., "Viewable Scene Modeling for Geospatial Video Search", 10 pages, 16th ACM Multimedia 2008 conference (ACM Multimedia 2008), Pan Pacific Hotel, Vancouver, BC, Canada, Oct. 27-Nov. 1, 2008, <http://eiger.ddns.comp.nus.edu.sg/pubs/stfp3153-arslanay.pdf>.

Hao et al., "Energy-Efficient Mobile Video Management using Smartphones", 12 pages, 2nd ACM Multimedia Systems Conference (MMSys 2011), San Jose, CA, USA, Feb. 23-25, 2011.

Hao et al., "Point of Interest Detection and Visual Distance Estimation for Sensor-rich Video", 12 pages.

International Search Report and Written Opinion issued in PCT Application No. PCT/SG2012/000051, mailed Mar. 21, 2012.

Kim et al., "A Design and Implementation of Geo-Tagged Video Search Framework", 44 pages, *Elsevier Journal of Visual Communication and Image Representation*, special issue on "Large-Scale Image and Video Search: Challenges, Technologies and Trends." vol. 21, Issue 8, Aug. 2010.

Shen et al., "Automatic Tag Generation and Ranking for Sensor-rich Outdoor Videos", *MM '11 Proceedings of the 19th ACM international C conference on Multimedia*, pp. 93-102, 2011.

Shen et al., "SRV-TAGS: An Automatic TAGging and Search System for Sensor-Rich Outdoor Videos", *MM '11 Proceedings of the 19th ACM international C conference on Multimedia*, p. 761-762, 2011.

Zhang et al., "Presentation of Geo-Referenced Videos with Google Earth", 6 pages, ACM Workshop on Surreal Media and Virtual Cloning (SMVC 2010), Florence, Italy, Oct. 29, 2010.

\* cited by examiner

P <longitude,latitude>:
camera location
θ : viewable angle
$\vec{d}$ : camera direction vector
R : visible distance P <longitude,latitude,altitude>:
camera location
θ,φ : horizontal and vertical viewable angles
$\vec{d}$ : camera direction vector (in 3D)
R : visible distance

| 23 | 23 | 22 | 16 | 14 | 17 | 17 | 15 | 16 | 17 | 19 | 20 | 19 | 19 |
|---|---|---|---|---|---|---|---|---|---|---|---|---|---|
| 24 | 25 | 22 | 17 | 13 | 14 | 15 | 20 | 21 | 20 | 20 | 21 | 17 | 17 |
| 24 | 24 | 21 | 14 | 12 | 13 | 16 | 22 | 23 | 21 | 20 | 18 | 16 | 18 |
| 23 | 20 | 21 | 14 | 10 | 9 | 15 | 23 | 23 | 22 | 19 | 15 | 16 | 17 |
| 22 | 18 | 15 | 12 | 11 | 13 | 18 | 22 | 22 | 21 | 16 | 13 | 15 | 15 |
| 14 | 17 | 13 | 12 | 11 | 14 | 17 | 20 | 20 | 16 | 13 | 11 | 12 | 13 |
| 2 | 3 | 4 | 6 | 6 | 8 | 9 | 9 | 10 | 10 | 8 | 8 | 8 | 7 |
| 2 | 2 | 3 | 3 | 3 | 3 | 3 | 6 | 6 | 6 | 6 | 4 | 4 | 4 |
| 1 | 2 | 2 | 2 | 3 | 3 | 3 | 3 | 4 | 4 | 3 | 2 | 3 | 4 |
| 1 | 2 | 2 | 1 | 1 | 3 | 3 | 3 | 3 | 3 | 2 | 2 | 2 | 2 |
| 0 | 1 | 1 | 1 | 1 | 2 | 3 | 3 | 3 | 3 | 1 | 1 | 2 | 1 |
| 0 | 1 | 1 | 1 | 1 | 2 | 2 | 3 | 3 | 1 | 1 | 1 | 1 | 0 |
| 0 | 0 | 1 | 1 | 1 | 1 | 2 | 2 | 2 | 1 | 1 | 1 | 0 | 0 |
| 0 | 0 | 1 | 1 | 1 | 1 | 2 | 2 | 1 | 1 | 1 | 0 | 0 | 0 |

FIG. 8A

| 0 | 0 | 0 | 0 | 0 | 0 | 2 | 6 | 8 | 8 | 6 | 5 | 1 | 1 |
|---|---|---|---|---|---|---|---|---|---|---|---|---|---|
| 0 | 0 | 0 | 0 | 0 | 0 | 5 | 8 | 8 | 8 | 8 | 7 | 5 | 1 |
| 0 | 0 | 0 | 2 | 2 | 2 | 8 | 9 | 9 | 8 | 9 | 9 | 8 | 4 |
| 4 | 7 | 10 | 14 | 19 | 12 | 21 | 25 | 22 | 18 | 18 | 16 | 19 | 15 |
| 5 | 9 | 14 | 19 | 21 | 24 | 37 | 39 | 40 | 39 | 37 | 31 | 28 | 21 |
| 5 | 9 | 15 | 18 | 21 | 27 | 41 | 52 | 58 | 54 | 46 | 40 | 35 | 28 |
| 5 | 8 | 14 | 18 | 21 | 30 | 46 | 57 | 60 | 63 | 55 | 53 | 44 | 36 |
| 4 | 7 | 13 | 18 | 21 | 30 | 51 | 59 | 59 | 60 | 53 | 54 | 49 | 37 |
| 2 | 7 | 13 | 16 | 19 | 30 | 55 | 57 | 55 | 52 | 53 | 45 | 46 | 45 |
| 1 | 7 | 12 | 14 | 19 | 31 | 51 | 53 | 50 | 48 | 47 | 43 | 41 | 43 |
| 0 | 8 | 11 | 14 | 18 | 31 | 49 | 47 | 46 | 44 | 41 | 40 | 39 | 39 |
| 0 | 9 | 11 | 14 | 16 | 27 | 40 | 40 | 42 | 39 | 37 | 37 | 36 | 34 |
| 0 | 9 | 11 | 14 | 16 | 17 | 32 | 32 | 28 | 27 | 26 | 25 | 28 | 25 |
| 0 | 7 | 10 | 11 | 6 | 8 | 25 | 26 | 22 | 18 | 20 | 13 | 12 | 13 |

FIG. 8B

```
<?xml version="1.0" encoding="UTF-8"?>
<array>
    <array>
        <date>2010-05-28T08:23:22Z</date>
        <real>1.3001484800000001</real>
        <real>103.76716863999999</real>
    </array>
    <array>
        <date>2010-05-28T08:23:59Z</date>
        <real>1.3001484800000001</real>
        <real>103.76716863999999</real>
    </array>
</array>

<?xml version="1.0" encoding="UTF-8"?>
<array>
    <array>
        <date>2010-05-28T08:23:22Z</date>
        <real>167.23540386557579</real>
    </array>
    <array>
        <date>2010-05-28T08:23:23Z</date>
        <real>167.23515872657299</real>
    </array>
</array>
```

APPARATUS, SYSTEM, AND METHOD FOR ANNOTATION OF MEDIA FILES WITH SENSOR DATA

CROSS-REFERENCE TO RELATED APPLICATIONS

This application is a national phase application under 35 U.S.C. §371 of International Application No. PCT/SG2012/000051 filed 21 Feb. 2012, which claims priority to U.S. Provisional Patent Application No. 61/445,036, entitled "APPARATUS, SYSTEM, AND METHOD FOR ANNOTATION OF MEDIA FILES WITH SENSOR DATA," filed on Feb. 21, 2011. The entire contents of each of the above-referenced disclosures is specifically incorporated herein by reference without disclaimer.

BACKGROUND OF THE INVENTION

1. Field of the Invention

The present invention relates generally to capture of multimedia in mobile devices and, more particularly, to systems and methods for multimedia annotation with sensor data.

2. Description of the Related Art

User generated video content is experiencing significant growth which is expected to continue and further accelerate. As an example, users are currently uploading twenty hours of video per minute to YouTube. Making such video archives effectively searchable is one of the most critical challenges of multimedia management. Current search techniques that utilize signal-level content extraction from video struggle to scale.

Camera sensors have become a ubiquitous feature in the environment and more and more video clips are being collected and stored for many purposes such as surveillance, monitoring, reporting, or entertainment. Because of the affordability of video cameras the general public is now generating and sharing their own videos, which are attracting significant interest from users and have resulted in an extensive user generated online video market catered to by such sites as YouTube. AccuStream iMedia Research has released a report forecasting that the user generated video market size is expected to expand 50% from 22 million in 2007 to 34 million in 2008. The report was based on data from popular video content providers including AOLUncut, Broadcaster.com, Crackle.com, Ebaumsworld, LiveDigital, Metacafe, MySpace TV, Revver.com, Vsocial.com, VEOH.com, Yahoo Video and YouTube. By 2010, more than half (55%) of all the video content consumed online in the US is expected to be user generated, representing 44 billion video streams. Companies are developing various business models in this emerging market, with one of the more obvious ones being advertising. In 2008, Forrest Research and eMarketer reported that the global online video advertising market will reach more than 7.2 billion by 2012.

Many of the end-user cameras are mobile, such as the ones embedded in smartphones. The collected video clips contain a tremendous amount of visual and contextual information that makes them unlike any other media type. However, currently it is still very challenging to index and search video data at the high semantic level preferred by humans. Effective video search is becoming a critical problem in the user generated video market. The scope of this issue is illustrated by the fact that video searches on YouTube accounted for 25% of all Google search queries in the U.S. in November of 2007. Better video search has the potential to significantly improve the quality and usability of many services and applications that rely on large repositories of video clips.

A significant body of research exists—going back as early as the 1970s—on techniques that extract features based on the visual signals of a video. While progress has been very significant in this area of content based video retrieval, achieving high accuracy with these approaches is often limited to specific domains (e.g., sports, news), and applying them to large-scale video repositories creates significant scalability problems. As an alternative, text annotations of video can be used for search, but high-level concepts must often be added manually and hence its use is cumbersome for large video collections. Furthermore, text tags can be ambiguous and subjective.

Recent technological trends have opened another avenue to associate more contextual information with videos: the automatic collection of sensor metadata. A variety of sensors are now cost-effectively available and their data can be recorded together with a video stream. For example, current smartphones embed GPS, compass, and accelerometer sensors into a small, portable and energy-efficient package. The meta-data generated by such sensors represents a rich source of information that can be mined for relevant search results. A significant benefit is that sensor meta-data can be added automatically and represents objective information (e.g., the position).

Some types of video data are naturally tied to geographical locations. For example, video data from traffic monitoring may not have much meaning without its associated location information. Thus, in such applications, one needs a specific location to retrieve the traffic video at that point or in that region. Unfortunately, current devices and methods are not adequate.

SUMMARY OF THE INVENTION

Embodiments of methods for multimedia annotation with sensor data (referred to herein as Sensor-rich video) includes acquisition, management, storage, indexing, transmission, search, and display of video, images, or sound, that has been recorded in conjunction with additional sensor information (such as, but not limited to, global positioning system information (latitude, longitude, altitude), compass directions, WiFi fingerprints, ambient lighting conditions, device orientation, etc.). The collection of sensor information is acquired on a continuous basis during recording. For example, the GPS information may be continuously acquired from a corresponding sensor at every second during the recording of a video. Therefore, the acquisition apparatus generates a continuous stream of video frames and a continuous stream of sensor meta-data values. The two streams are correlated in that every video frame is associated with a set of sensor values. Note that the sampling frequency (i.e., the frequency at which sensor values can be measured) is dependent on the type of sensor. For example, a GPS sensor may be sampled at 1-second intervals while a compass sensor may be sampled at 50 millisecond intervals. Video is also sampled at a specific rate, such as 25 or 30 frames per second. Sensor data are associated with each frame. If sensor data has not changed from the previous frame (due to a low sampling rate) then the previously measured data values are used. The resulting combination of a video and a sensor stream is called a sensor-rich video.

Embodiments of a system for multimedia annotation with sensor data includes one or more cameras, microphones, configured to acquire and manage multimedia that are being tagged with sensor properties, captured by one or more sensors, of the camera or microphone environment during recording (for example, but not limited to, geographic information). The collected and correlated sensor properties, subsequently also called meta-data, are then utilized for storing, indexing, searching, handling and presenting large collections of videos in novel and useful ways. By considering video related meta-data and cross-correlating all the information, videos can be better managed, searched and presented. The current Sensor-rich video system implementation demonstrates a system that consists of several acquisition applications for mobile devices and a sample video search portal. One of the novel Sensor-rich video processing aspects is the use of an estimation model of a camera's viewable scene. For Sensor-rich video video acquisition, the system uses automated annotation software that captures videos, their respective field-of-views (FOV) and other sensor information. Prototype Sensor-rich video recording applications have been implemented for both Android and iOS devices. It could also be made available for suitably equipped laptops, tablets and other computers. As one possible use case, the acquisition software apps allow community-driven data contributions to the Sensor-rich video portal. Various other application scenarios can also be envisioned.

In sensor-rich videos, the video and the sensor stream are correlated, i.e., every video frame is associated with a set of sensor values and vice versa. The sensor stream can also be considered a sensor-description of the video. Importantly, note that the sensor stream is generally much smaller in its size than the corresponding video. For example, while a video stream may be 10 megabytes in size, the associated sensor-stream may be only 10 kilobytes in size (i.e., 1000 times smaller). This difference in size of the sensor stream allows for novel and efficient ways to describe a video in a compact manner.

The rich sensor information is used to describe the geographic coverage of the video content (i.e. video viewable scenes). One naïve, traditional approach is the abstraction of the spatial video coverage using a circular sector around the camera location point. This approach overestimates the scene coverage by disregarding the viewing direction. In Sensor-rich video, a novel viewable scene model is introduced, which is derived from the fusion of location and direction sensor information with a video stream. Using this model, videos are stored as spatial objects in the database and searched based on their geographic properties. This model strikes a balance between the complexity of its analytical description and the efficiency with which it can be used for fast searches. Note that the sensor-data provides an abstraction of the video content—hence the videos can be managed based on this abstraction.

In one embodiment, sensor-data streams can be managed and/or handled separately from the bulky, binary video streams. The small (in size) abstraction provided by the sensor data is often sufficient in many video applications. Overall, the properties of sensor-rich video result in a number of interesting technical solutions, such as real-time transmission and search.

The generally small size of the sensor information allows for its efficient storage and transmission. For example, when sensor-rich video is captured on a mobile device (for example, an Android- or iOS-based smartphone) then the sensor stream may be transmitted to a server first and the bulky video data later. The small size of the sensor data allows for robust and fast transmission to, say, a portal, on which the information can be further processed and made available to other users. Wireless networks, such as 3G, in general provide limited upload bandwidth and hence submitting the small sensor data is beneficial as it results in fast transmissions with a smaller chance of connection disruptions. In general, the sensor information can be detached from the video and handled separately, while the correlation between the video and the sensor streams is maintained via a unique and shared identifier. The streams can later be re-combined, if so desired.

In order to allow the sharing of sensor information with very short delay, a mobile device can continuously transmit the sensor stream to a portal server, while at the same time recording and storing video in its local memory (e.g., on flash storage). The continuously uploaded sensor-stream can be processed and shared with other users with very short delay (i.e., in real-time) such that other users can understand which geographical regions are currently being video-recorded. As an application scenario consider a brush fire, battled by firefighters that are equipped with mobile devices that they use to momentarily record sensor-rich video about the fire situation in their area. By uploading the sensor information continuously during the recording, the mission supervisor has excellent situational awareness of where his men are operating and of which areas video has been captured. The supervisor could then remotely request for video uploads from specific crew members, if he/she would like to see the captured video. The portal system would then contact the corresponding mobile device and initiate a video upload. Note that this kind of on-demand video transmission is very energy and bandwidth efficient for the mobile devices, since only the requested video bulk data is transmitted. This would be significantly better than uploading video from all devices during all the recording time. In fact, this may not be technically feasible because of bandwidth limitations or it may be cost-prohibitive. Note also that on-demand video upload can be very targeted as a remote user (e.g., the supervisor) can request a specific segment of a video (delimited in various ways such as by time, location, etc.) and there is no need to upload all the video. A user can also request small video snippets first to assess the relevance of its content and then slowly direct his attention to larger video segments from the area of greatest interest.

In addition to uploading sensor information about a recorded video in real-time, a mobile device could also upload key frames of the video at specific intervals. Key frames are extracted from the video and represent snapshots that allow a user to gain a quick understanding of the visual content of a video. Since key frames would be extracted and transmitted at intervals (say every 10 seconds, or triggered by certain events), their transmission would still be more energy efficient than the transmission of a continuous video stream. The benefit of key frames is that they would provide visual information, in addition to the sensor stream data (e.g., location and direction of the camera). Key frames could be presented to the user on a map along the trajectory of the camera path.

Sensor data, as it is scalar and alphanumeric in nature can be efficiently indexed on the portal or within a large video archive. The benefits of such indexing is that it allows for efficient search of identifying and selecting videos with certain properties, for example, videos or video segments that show a certain geographical area.

Large archives of sensor-rich videos may be browsed and presented in various ways. One natural representation is to draw the camera path (also called a trajectory) on a map. In addition to the camera location, the camera viewing direction or the viewable scene (representing the observable area of the camera lens, i.e., a volumetric cone) can also be drawn. Multiple camera trajectories representing different captured videos can be shown on a map simultaneously. A user can select an area, for example by visually drawing a rectangle, to select the videos he/she would like to see. The system then finds and presents the representative video segments either on the map or in a separate window. Video segments are the portions of a video that satisfy the user search criteria. For example, when a geographical range search is performed, only the video segments that overlap with the search area are returned as the results. Browsing and presentation can also be performed on a mobile device. Depending on the devices capability and its screen resolution various ways to allow for user input (i.e., specifying the search criteria) and presentation of the resulting videos are envisioned. For example, the current location of the mobile device could be used to search for geographically related videos.

In various embodiments, a search may result in a large number of results being returned. In such a case, similar to textual searches on a search engine such as Google, the results may be ranked according to relevance. Video relevance can be computed in various ways. One possibility is to compute the spatio-temporal overlap between the video trajectory and viewable scenes with the search region specified by the user. The more considerable and longer the overlap is, the higher the videos relevance ranking. Other overlap properties, such as the proximity of the search region to the camera's location and search region's appearance within the video frames (i.e. how close is the query region to the center of the frame) can also be used in relevance calculation. The closer and the more at the center the search region is, the higher the videos relevance ranking will be.

Embodiments of the method and system leverage sensor-collected meta-data (camera locations and viewing directions) which are automatically acquired as continuous streams together with the video frames. Existing smartphones can easily handle such integrated recording tasks. By considering a collective set of videos and leveraging the acquired auxiliary meta-data, the approach is able to detect interesting regions and objects and their distances from the camera positions in a fully automated way. Such embodiments exhibit computational efficiency, and therefore are very scalable.

The term "coupled" is defined as connected, although not necessarily directly, and not necessarily mechanically.

The terms "a" and "an" are defined as one or more unless this disclosure explicitly requires otherwise.

The term "substantially" and its variations are defined as being largely but not necessarily wholly what is specified as understood by one of ordinary skill in the art, and in one non-limiting embodiment "substantially" refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 8A is a color highlighted visualizations for overlap histograms for video $V_{46}$ $V_{108}$.

FIG. 8B is a color highlighted visualizations for overlap histograms for video $V_{108}$.

DETAILED DESCRIPTION

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Figure 1:
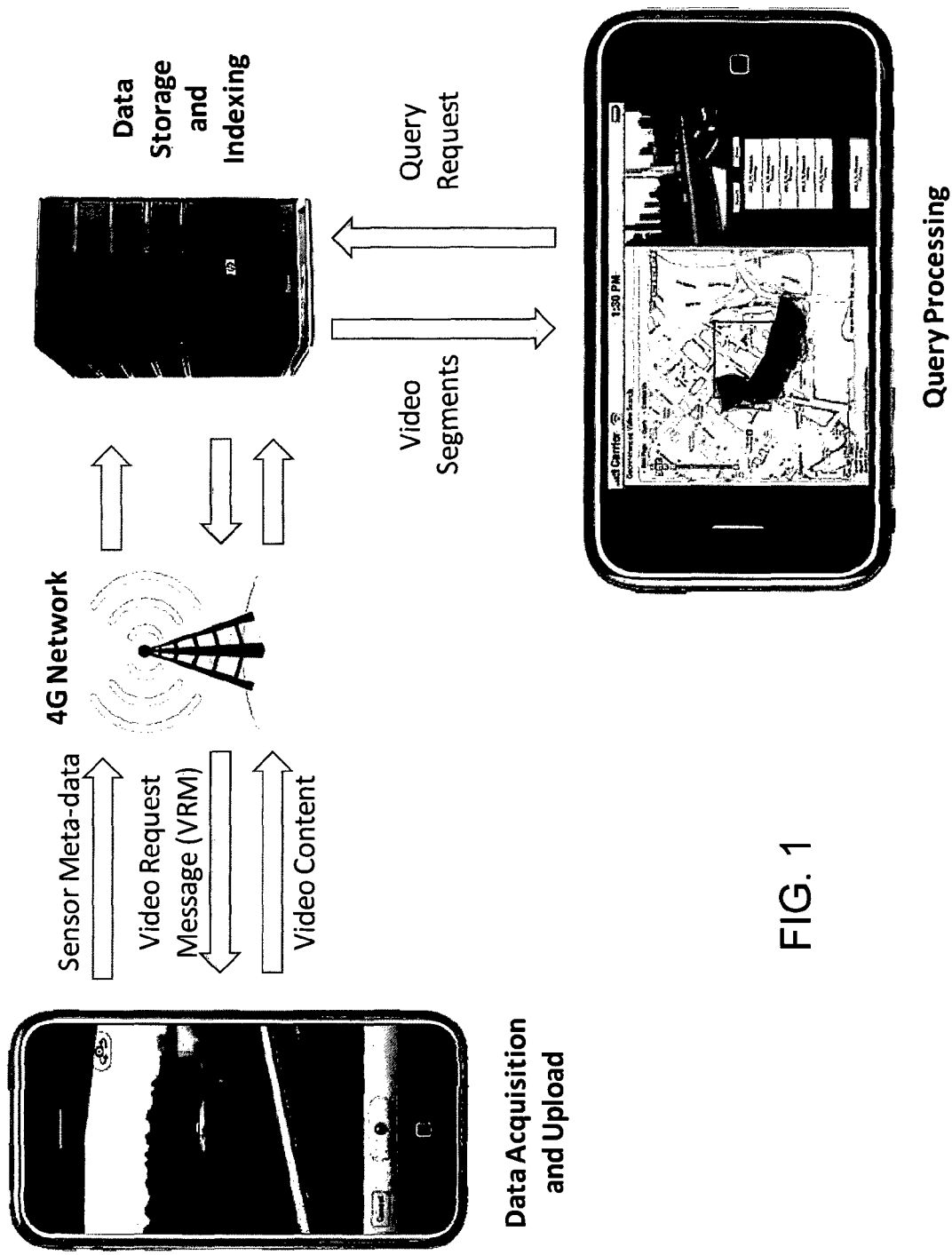
FIG. 1 is a schematic block diagram illustrating one embodiment of a system for generating annotated images associated with metadata comprising information generated by one or more system sensors.

The cameras embedded in phones have improved rapidly in recent years. Therefore, users can capture high quality videos with devices that they carry with them all the time. The Sensor-rich video system leverages this phenomenon and introduces the concept of sensor-rich video capture which can be further used in various ways, for example for real-time video sharing. An embodiment of a sensor-rich video system, consisting of mobile acquisition app components and a server portal component is shown in FIG. 1.

Current-generation smartphones (and other mobile devices) contain many sensors such as a GPS receiver, a compass, an accelerometer, etc., all embedded into a small, portable, and energy-efficient are automatically annotated with sensor-rich information. Uploading to a server is performed at the push of a button. Video and sensor information is automatically correlated and the information may be interleaved or transmitted in various ways (see attached research manuscript).

In a sensor-rich video system, videos are uploaded and are made available to be searched. The system manages both the uploaded videos and the related sensor meta-data information. One of the functions is to maintain the correspondence between the data. The system presents a user with a map as an interaction interface. The user may then place an indicator that indicates the search area on the map to the desired location. The user can search for and play matching videos, where the videos show the region in the target area. The system may also allow a user to index and/or smooth data, compute distances between two points, or the like.

In one embodiment, search and display are also available on mobile phones. In one embodiment, the system takes advantage of the sensors in the phones to specify some parts of the query. For example when the user holds the phone in one direction this will trigger a search to the server by sending the GPS location and orientation information. The portal will send back relevant videos to users by finding all the videos within the relevant proximity of the user. This is very useful as users could use their smartphone to quickly explore a location. They could also check its history and find out about the changes by viewing videos that were taking with the same direction and at the same location some time ago.

Embodiments of the system of FIG. 1 generate sensor-rich multimedia, including video recordings, and management. For example, video may be automatically annotated with relevant meta-data information. An important aspect is that the meta-data is automatically collected, relieving the user from the task of entering annotation keywords to describe the video. Furthermore, the collected sensor data is non-ambiguous (i.e., objective), unlike keyword-annotation performed by users where ambiguous and non-relevant descriptions may be entered. The sensor-enriched multimedia may be suitable to be processed efficiently and effectively in a number of ways. For example, videos can be searched, managed and presented based on their geographic properties.

One benefit of the described embodiments is that sensor-annotation can be done very conveniently and cost-effectively on current-generation mobile devices (e.g., smartphones). These devices contain many or all of the sensors and are now available at relatively low cost and in high-volume numbers. Therefore, users can capture high quality videos with devices that they carry with them all the time.

In one embodiment a user may be able to upload, search and view videos in real-time.

Sensor-rich video includes advanced features based on augmented sensor information which makes the sharing experience more social, enjoyable, and technically scalable beyond simple video uploading and viewing.

Design and Implementation of Sensor-Rich Video Search Framework

Framework

The mobility of cameras in the framework is of particular interest because of the ubiquity of mobile devices and the prominent importance of geographic properties of moving cameras. More and more user generated videos are produced from mobile devices such as cellular phones. To address the issues of sensor-rich video search, the framework consists of the three main parts: (1) the data collection at mobile devices, (2) the search engine to store, index, search and retrieve both the meta-data and video contents, and (3) the user interface to provide web-based video search services. These main parts may be communicating through the Internet and/or cellular network.

Data Collecting Device: A mobile device can be any camera equipped with sensors and a communication unit. A good example is Apple's iPhone 3GS that includes GPS, digital compass, accelerometer, 5 mega pixel camera, WiFi/Broadband data connection, and programming capability.

At the mobile device level, the main objective is to capture the sensor inputs and to fuse them with the video for future storage and retrieval of videos. Sampling individual sensor data, especially widely available location data, may be straightforward due to the wide availability of sensors and their interface software. However, various types of sensors provide different characteristics such as sampling rate and precision of the sampled value. For example, videos are recorded at the rate of 30 frames per second while the GPS location can be sampled just once per second at most and a digital compass can sample more than 40 times per second. Moreover, there can be missing sample values or measurement errors due to various reasons such as bad weather, which may impact the accuracy of search.

The following issues need to be considered at the device level. First, the sampled sensor data should be synchronized and tagged in accordance with the recorded video frames.

This automatic synchronized annotation forms the basis of the proposed framework. To accommodate the different sampling rates of devices, sample values might be manipulated using numerical methods such as interpolating, averaging, etc. The sampling frequency can be periodic, or aperiodic using any adaptive methods. An adaptive method can be more efficient and desirable in a large scale application since it can minimize the amount of the captured data and support a more scalable system. Second, it is desirable to represent the collected meta-data using a standard format, regardless of the number, type, and precision of sensors, for general acceptance in diverse applications. This is critical when the video search is extended to user generated videos on public web sites. Third, the meta-data are either 1) embedded into the video contents or 2) handled separately from the video contents. The embedding granularity can be at each frame, segment, scene or clip level of the video. The former requires a standard embedding method based on a specific video technology. The problem is that there are so many different video coding techniques. The latter works independently from the video coding techniques, however it presents a verification problem between a video file and its meta-data.

The captured video and sensor data are in general immediately transmitted to the server in their entirety. This approach may work well for small-sized applications. However, when a large scale video collection from thousands of mobile devices is considered, which have expensive communication cost or limited communication capability, this immediate video and meta-data transmission scheme might not be cost-efficient. One important observation is that not all collected videos are important or requested immediately. In many applications, the providers of data and their consumers are working independently. In other words, providers are collecting data at their own schedules and consumers are querying data at their convenience, which results in a time gap between the data collection and the data retrieval. Another observation is the expensive wireless communication cost from mobile devices such as cellular phones. When a huge amount of video is transmitted immediately after being collected but not requested for a while in an application, it may not be the most cost efficient way to use expensive cellular communication.

There are ways to overcome the drawbacks of the immediate data transmission scheme. For example, video data can be delivered on an on-demand basis. Assuming that not all captured videos from mobile devices will be immediately requested by users, i.e., if they are not selected as query results, such immediate data transmission through costly wireless networks may not be necessary. When the meta-data and the captured video data are separated, the system may first transmit the meta-data to the server while transmitting video data in a delayed manner. Then, searching on the captured video can be performed immediately without actual data transmission. Depending on the search results, the actual video data can be transmitted on an on-demand basis. Any requested videos will be transmitted as soon as possible, however the captured but not-immediately requested videos may be transmitted to the server through a high speed wired network (i.e., cost effective) during less busy periods of a day (i.e., better distribution of server load). This separate management of the geographic properties of videos (i.e., small amount of textual data) and actual video (i.e., large amount of binary data) can provide a higher flexibility for the design of service architectures, service models and policies. Real-time meta-data transmission and on-demand based video transmission enable a real-time search at the server while utilizing a more cost-efficient transmission of large video data over expensive cellular network. Note that this separation of the meta-data from video contents incurs extra processing for the synchronization and verification of the meta-data. However, since it provides more advantages than disadvantages, it may be assumed that the meta-data is separately managed from the video content.

Any mobile device includes the following modules in the framework: Sensor data collection module: following a predetermined rate and precision, sensor inputs are captured through various sensors including video, GPS, compass, accelerometer, etc. Sensor signal processing module: some input values may need to be checked and refined. For example, video content can be checked for clarity or occlusion. Accelerometer input can be filtered for a clearer signal. Sensor measurement errors can be detected and missing sample values can be estimated here. Format module: for a broader and transparent use of the collected data, a standard way to annotate the collected sensor inputs is implemented here, which also includes the synchronization among video contents and sensor data. The format should cover the following information: identification of device and video, real time of recorded data, types of sensors, sample values, precision of the sampled data, synchronization among video and other sensor inputs, etc. Communication module: defines and controls the data transmission between the mobile device and the server based on a predefined protocol. This module needs to provide versatile ways to accommodate diverse applications and service models.

Figure 2:
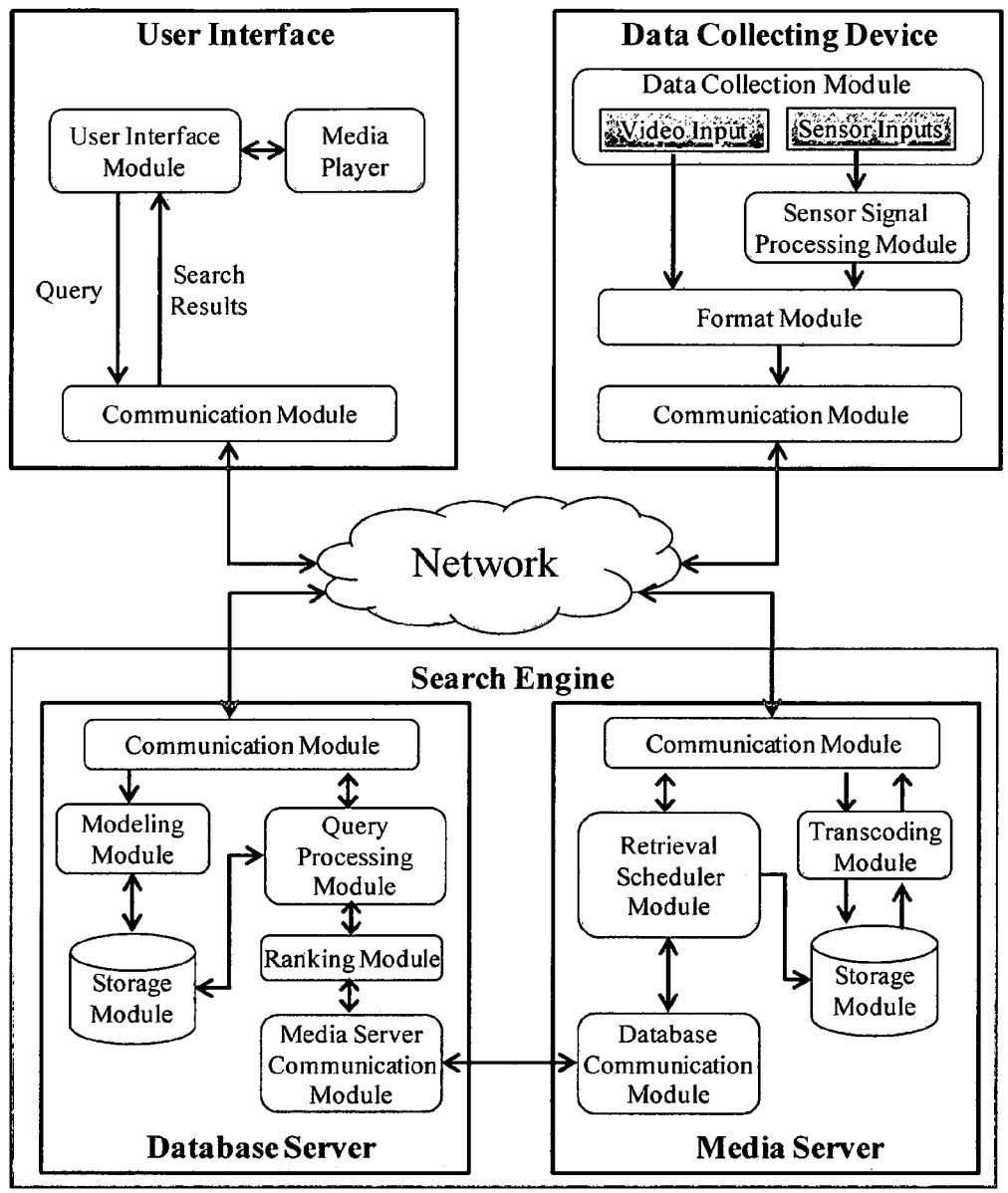
FIG. 2 is framework structure and modules.

Search Engine: Since videos are searched only by the abstraction of their geographic properties, not by their visual information, meta-data is managed by a database server while videos are managed by a media server. Any conventional database and media server can be used. The collected meta-data from the mobile device are delivered to the database server while the video contents are stored in the media server. In FIG. 2 shows a tightly coupled database and media server on the same platform. However, sensor-rich video search applications can be implemented at various scales. As the amount of video grows, a single media server might not be enough to provide the storage and streaming of videos while the amount of meta-data can be managed by a single database server. Then, the search engine can consist of a single database and multiple media servers (even heterogenous media servers to efficiently support various types of videos). For the most general and large scale applications, multiple database servers and media servers are distributed across a wide area and collaborate with each other. For a focused discussion, this paper assumes the simplest configuration, i.e., a single database and media server on the same machine.

Figure 3:
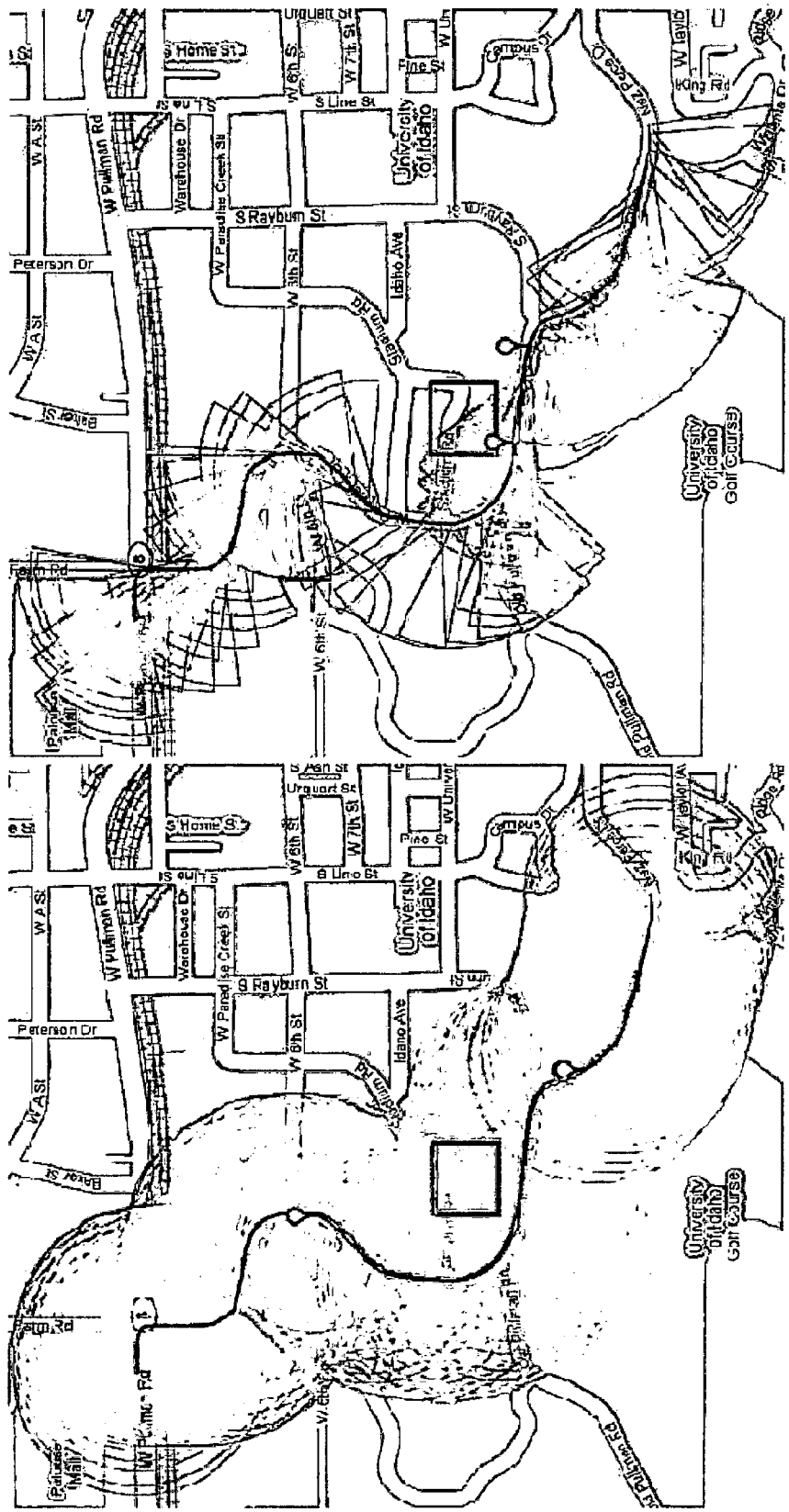
FIG. 3 is a comparison of two models.

Database Server; To utilize the captured geographic properties of videos for searching, the framework represents the coverage area of video scenes as spatial objects in a database, i.e., it models the coverage area using the meta-data. Then, the problem of video search is converted to the problem of spatial object selections in a database. Modeling the video scenes depends on the availability of sensor data. For example, in the presence of only GPS input (the camera location data) the potential coverage area of video frames can be represented as a circle centered at the camera location (CircleScene in FIG. 3). With extra camera direction data from a digital compass, the coverage area can be more accurately refined like a pie slice (also called the field of view, FOV) shown in FIG. 3 (more precisely in FIG. 4). Thus, videos represented by the pie model can be searched more effectively. Modeling may facilitate indexing and searching of video contents in a database because the query functionality and performance are greatly impacted by the spatial modeling of videos.

Using the defined model, videos are stored and searched as spatial objects in a database. Video searching should be able to fully take advantage of the collected meta-data for various requests of applications. Beyond the importance of the geographic information where a video is taken, there are other obvious advantages in exploiting the spatial properties of video because the operation of a camera is fundamentally related to geometry. When a user wants to find images of an object captured from a certain viewpoint and from a certain distance, these semantics can be interpreted as geometric relations between the camera and the object, such as the Euclidean distance between them and the directional vector from the camera to the object. Thus, more meaningful and recognizable results can be achieved by using spatial queries on sensor-rich videos.

Search types exploiting the geographic properties of the video contents may include not only conventional point and range queries (i.e., overlap between the covered area of video and the query range), but also new types of video specific queries. For example, one might want to retrieve only frames where a certain small object at a specific location appears within a video scene, but with a given minimum size for better visual perception. Usually, when the camera is closer to the query object, the object appears larger in the frame. Thus, a search with a range restriction for the distance of the camera location from the query point can be devised, which is termed as a distance query. Similarly, the camera view direction can be an important factor for the image perception of an observer. Consider the case where a video search application would like to exploit the collected camera directions for querying, say a directional query. An example search is, "For a given query point in geo-space, find all video frames taken with the camera pointing in the Northwest direction and overlapping with the query point." The view direction can be defined as a line of sight from the camera to the query point (i.e., an object or place pictured in the frame). For the implementation of the video domain specific query types, new indexing techniques or database query functionalities need to be introduced. Moreover, the evaluation of new query types should be fast enough to be practical, especially for a large scale video search. There has been little research on these issues.

After a search results in multiple videos in a large application, another challenge is that human visual verification of the video results may take a significant amount of time. To enhance the effectiveness of the result presentation, an approach is to quantify the relevance of resulting videos with respect to the given query and to present the results based on their relevance ranking. The difficulty lies in the fact that the human appreciation process of relevance is very subjective and so it is challenging to be quantified. The framework harnesses objective measurements to quantify the relevance between a query and videos in two different ways: 1) spatial relevance: overlapping coverage area between query range and a video, 2) temporal relevance: overlapping covered time.

Figure 4:
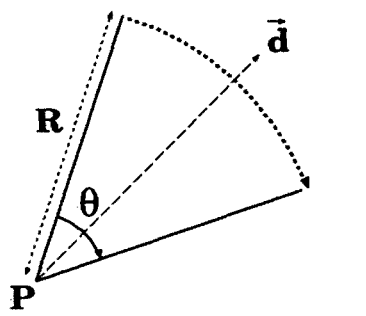
FIG. 4 is an illustration of camera field of view (FOV) (a) in 2D (b) in 3D.
Figure 4:
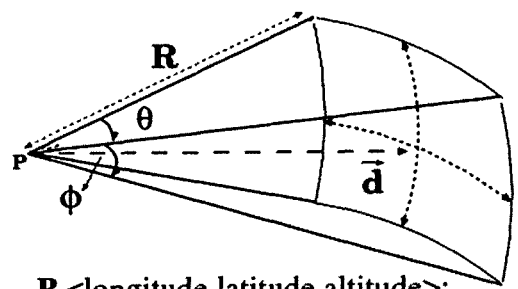

The database server can consist of the following modules: Modeling module: received sensor data will be processed for a specific application by applying a model for sensor-rich video search. It can be as simple as a geospatial coverage of camera field of view (FOV) as shown in FIG. 4 or a more sophisticated spatio-temporal multidimensional model. The adopted model affects the query functionalities and performance of the system. Storage Module: based on the model, the meta-data are stored using an appropriate data structure and indexes. Query processing module: this module receives user queries and performs the actual searching. Not only the conventional spatio-temporal query types such as point and range queries but also domain specific query types such as directional queries are implemented and serviced. Ranking module: the results from the query processing module, i.e., a group of video segments found, can be ranked and ordered by the relevance to the given query. Communication module: defines and controls the data transfer between a mobile device and the server based on a predefined protocol. It needs to provide a versatile way to accommodate diverse applications and service models.

Media Server: The role of media server is to store actual video contents and to provide streaming service to users. In general, the media server obtains a list of video segments as query results and transmits them to the user in a predefined way. Different user interfaces can present the search results in different ways so the media server corresponds to the requests of the user interface. One critical functionality of the media server in the framework is the ability to randomly access any portion of stored videos in a fast way. Since the amount of data in an entire video clip can be very large and the user might be interested in watching only a portion of the video where the query overlaps, random access is very important for humans to verify the results.

Transcoding module: a video might need to be transcoded when it arrives at the server. For example, a user can collect videos in any format but the application might require certain predefined formats for the service. Similarly, when users request the display of the query results, videos can be transcoded to accommodate the different supported video formats between the server and user devices.

Storage module: videos are stored based on the underlying storage system and the media server technology.

Retrieval scheduler module: the query results from the database server are analyzed by this module to provide the most efficient way to retrieve the requested data. The media server is requested to access random video segments to provide a fast presentation of the searched video segments.

Database communication module: depending on the service model and application, the database server and the media server can be coupled in two ways: 1) tightly coupled—two servers are customized for a specific application so that more sophisticated service is possible through a close communication between the two. For example, two servers can be implemented on the same machine so any content-based ranking can be applied before presenting the query results for a more precise ranking. 2) loosely coupled—independent and general media servers are collaborating with the database server through the standard network protocols. It is usually not expected to closely interact between two servers but can be more appropriate for distributed server environment, peer-to-peer video sharing, or web video crawling. The media server is straightforwardly streaming video contents to users under the database server's direction.

User Interface: Users should be able to send video search queries to the search engine from both wired computers and mobile devices. Then, depending on the type of devices, the user interface can be designed in different ways. The framework assumes a web-based user interface to communicate with the search engine. Depending on the computing power of the user's machine and the availability of other supporting software (e.g, Google Maps, media player, web browser), the features of the sensor-rich video search applications can be significantly affected.

Figure 13A:
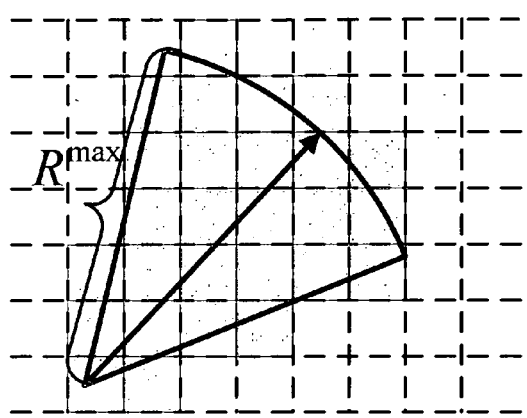
FIG. 13A is a sector-based coverage model.
Figure 13B:
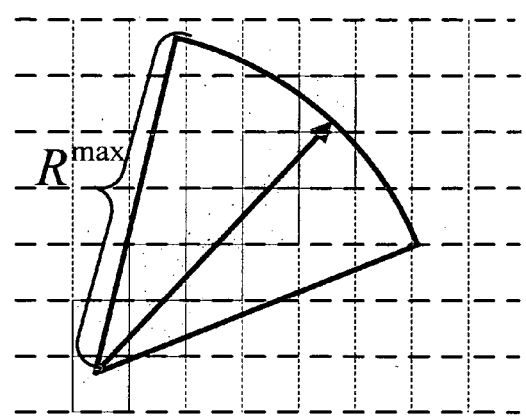
FIG. 13B is a center-line-based coverage model.

Users can search videos in multiple ways. For example, one intuitive method is making a map-based query when users are familiar with the interested area. Drawing a query directly on any kind of map (see the implementation examples in FIGS. 13 and 14) might provide the most human-friendly and effective interface in the paradigm. Alternatively, text-based query can be also effective when users are searching for a known place or object. For example, the user interface can maintain a local database of the mapping between places and their geo-coordinates. Then, the textual query can be converted into spatial query with exact longitude and latitude input. The search engine can maintain a large collection of such mappings for well known places.

The user interface receives the ranked query results from the search engine. As well as a good ranking method, the presentation style or format of the results also greatly affects the effectiveness of the presentation. Thus, human friendly presentation methods should be considered such as using key frames, thumbnail images, any textual descriptions, etc. A map-based user interface for both query input and video output can also be an effective tool by coordinating the vector map and actual video display. Note that relevance ranking and presentation style are not just technical issues, but may require an intensive user study.

The framework includes the following modules at the user side: User interface module: For regular computers, a normal web-based interface with maps can be expected. Users can exploit all possible tools for an effective and efficient querying, communication, presentation of results. The video contents can be delivered and presented without changing the format, i.e., a high quality video if communication bandwidth is enough. For the mobile devices, the user interface design should be adjusted for the limited size of the display, computing power, and ability to handle video formats. Media player: The media player software plays out the query results. One important aspect of video presentation is the capability to display only relevant segments of videos at the user side avoiding unnecessary transmission of video data. Thus, the media player at the user side and the streaming media server are expected to closely collaborate.

Implementation Case Study

Here, the solutions of the modules in implementing the framework is introduced. Note that the present disclose is not necessarily providing optimal solutions for all modules discussed, but instead intend to provide an example solution for each critical module to demonstrate the feasibility and adequacy of the proposed sensor-rich video search framework.

Collecting Sensor Data and Modeling Viewable Scene: The implementation focuses on the geographic properties of the video contents, i.e., the exact area on the ground covered by the video scenes. To capture the geographic properties, the video recording system is prototyped with three devices: a video camera, a 3D digital compass, and a Global Positioning System (GPS). It is assumed that the optical properties of the camera are known. The digital compass mounted on the camera heads straight forward as the camera lens. The compass periodically reports the direction in which the camera is pointing with the current heading angle (with respect to North) and the current pitch and roll values. The GPS, also mounted on the camera, reports the current latitude, longitude, and altitude of the camera. Video can be captured with various camera models. The custom-written recording software receives direction and location updates from the GPS and compass devices as soon as new values are available and records the updates along with the current computer time and coordinated universal (UTC) time.

A camera positioned at a given point p in geo-space captures a scene whose covered area is referred to as camera field-of-view (FOV, also called a viewable scene), see FIG. 4. The meta-data related to the geographic properties of a camera and its captured scenes are as follows: 1) the camera position p is the latitude, longitude coordinates read from GPS, 2) the camera direction a is obtained based on the orientation angle ($0° \leq \alpha < 360°$) provided by a digital compass, 3) the maximum visible distance from p is R at which objects in the image can be recognized by observers—since no camera can capture meaningful images at an indefinite distance, R is bounded by M which is the maximum distance set by an application -, and 4) the camera view angle $\theta$ describes the angular extent of the scene imaged by the camera. The angle $\theta$ is calculated based on the camera and lens properties for the current zoom level. The above geo-properties are captured from a sensor-equipped camera while video is recorded. Note that some commercial cameras are already equipped with those sensors or expected to be equipped in the very near future.

Based on the collected meta-data, the viewable area is modeled in 2D space, which is represented as a circular sector as shown in FIG. 4(a). For a 3D representation shown in FIG. 4(b), the altitude of the camera location point and the pitch and roll values are needed to describe the camera heading on the zx and zy planes (i.e., whether the camera is directed upwards or downwards). It is believed that the extension to 3D is straightforward, especially since the altitude level is already acquired from the GPS and the pitch and roll values from the compass. Thus, the FOV is represented in 2D space.

One important point in data collection is the difference in the data sampling frequencies. The GPS location updates are available every one second whereas compass can produce 40 direction updates per second. And for a 30 fps video stream there will be 30 frame timecodes for every 1 second video. An intuitive way is to create the combined dataset as the sensor data is received from the devices and use a common timestamp for the combined tuple. Such a tuple will include the last received updates for the location and direction values. Because of the heterogeneity in data frequencies, it is possible to match data items which are not temporally closest. A better way is to create separate datasets for GPS updates, compass readings and frame timecodes, and later combine the data items from each data set that has the closest time match. Since all sensor values will be refreshed at most every second, intuitively, the data frequency for the combined dataset will be a second.

A periodic data collection was used in the implementation, i.e., an update per one second. Thus, in the implementation, a n second long video is represented with n FOVs each representing the geographic properties of one second long video frames. Table 1 shows the collected geo-tagged meta-data for a 5 sec long video, where each row (i.e., tuple) corresponds to an FOV. In Table 1, Timestamp is the computer time when the meta-data is recorded and Timecode is the corresponding frame timecode in the actual video.

TABLE 1

Example georeferenced meta-data tuples.

| FOV | Vid | p <lat-lon> | α(°) | R(m) | θ(°) | Timestamp | Timecode |
|---|---|---|---|---|---|---|---|
| 522 | 22 | 46.741548, −116.998496 | 257.4 | 259 | 60 | 2008-03-30 19:22:13.375 | 0:53:46:24 |
| 523 | 22 | 46.741548, −116.998498 | 6.2 | 259 | 60 | 2008-03-30 19:22:14.843 | 0:53:47:24 |
| 524 | 22 | 46.741547, −116.998490 | 4.3 | 259 | 60 | 2008-03-30 19:22:15.375 | 0:53:48:24 |
| 525 | 22 | 46.741547, −116.998488 | 359.5 | 259 | 60 | 2008-03-30 19:22:16.375 | 0:53:49:24 |
| 526 | 22 | 46.741547, −116.998485 | 3.2 | 259 | 60 | 2008-03-30 19:22:17.375 | 0:53:50:24 |

Relevance Ranking in Georeferenced Video Search
Querying Georeferenced Videos

Figure 5:
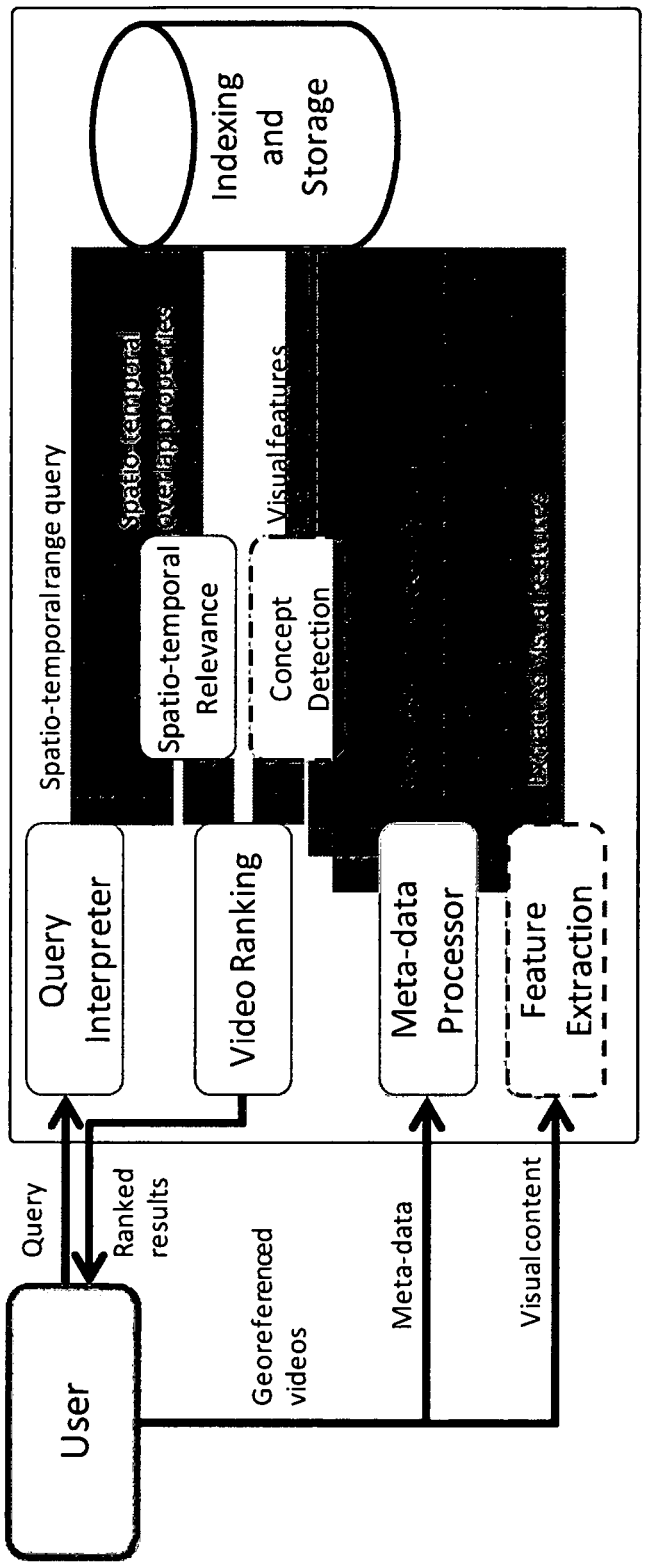
FIG. 5 is Georeferenced Video Search Architecture.

FIG. 5 sketches the proposed video search architecture. Users collect georeferenced videos using the acquisition software and upload them into the search system. The uploaded video meta-data is processed and the viewable scene descriptions are stored in a database. An intuitive way is to store a separate $\mathbb{F}$ quintuple including the timestamp, camera location, visual angle, viewable distance, and camera heading plus the camera id and video id for each video frame.

The user query is either a geographical region or some textual or visual input that can be interpreted as a region in geospace. The Query Interpreter in FIG. 5 translates the user query into a spatio-temporal query. As an example, the query "Find the videos of the University of Idaho Kibbie Dome" is translated into the coordinates of the corner points of the rectangular region that approximates the location of the dome. The database is then searched for this spatial region and the video segments that capture the Kibbie Dome are retrieved. If the query specifies a temporal interval, only the videos that were recorded during the specified time window are returned. The FOVScene coverage of a moving camera over time is analogous to a moving region in the geo-spatial domain, therefore traditional spatio-temporal query types, such as range queries, k nearest neighbor (kNN) queries or spatial joins, can be applied to the $\mathbb{F}$ data. One of the tasks is to extract the video segments that capture a given region of interest during a given time interval. As explained, the $F(t, P, \vec{d}, \theta, R)$ description can be constructed for every time instance. Hence, for a given query Q, the sequence of video frames whose viewable scenes overlap with Q can be extracted. Going from most specific to most general, the region of query Q can be a point, a line (e.g., a road), a poly-line (e.g., a trajectory between two points), a circular area (e.g., neighborhood of a point of interest), a rectangular area (e.g., the space delimited with roads) or a polygon area (e.g., the space delimited by certain buildings, roads and other structures). Details of range query processing can be found in the prior work. The proposed viewable scene model, which is based on the camera location (P) and view direction ($\vec{d}$), provides a rich information base for answering more complex geospatial queries. For example, if the query asks for the views of an area from a particular angle, more meaningful scene results can be returned to the user. Alternatively, the query result set can be presented to the user as distinct groups of resulting video sections such that videos in each group will capture the query region from a different view point. Some further aspects of a complete system for querying georeferenced videos—such as indexing and query optimization—will be explored as part of the future work.

The query processing mechanism does not differentiate between highly-relevant and irrelevant data and presents all results to a user in random order. In many applications this will not be acceptable. The present disclosure ranks the search results based on their relevance to the user query. The Video Ranking module in FIG. 5 rates search results according to the spatio-temporal overlap properties, i.e., how much and how long the resulting video segments overlap with the query region.

Although the objective of the study is to rank results based on the queries' spatio-temporal attributes, for some applications the video ranking accuracy can further be improved by leveraging the features extracted from the visual video content. In FIG. 5, the Concept Detection module provides information about the semantic content of the video segments to aid the ranking process. A detailed discussion of content based video search and ranking techniques is out of the scope of the paper. A review of state-of-the-art solutions can be found in the literature. It is provided here some example queries for which the ranking accuracy can be improved by leveraging visual features in addition to spatio-temporal overlap properties. Note that content based feature extraction is currently not implemented in the prototype system.

Ranking Georeferenced Video Search Results

In video search, when results are returned to a user, it is critical to present the most related videos first since manual verification (viewing videos) can be very time-consuming. This can be accomplished by creating an order which ranks the videos from the most relevant to the least relevant. Otherwise, although a video clip completely captures the query region, it may be listed last within the query results. The relevance of each video may be questioned with respect to the user query and an ordering based on estimated relevance may be provided. Two pertinent dimensions to calculate video relevance with respect to a range query are its spatial and temporal overlap.

Analyzing how the FOVScene descriptions of a video overlap with a query region gives clues on calculating its relevance with respect to the given query. A natural and intuitive metric to measure spatial relevance is the extent of region overlap. The greater the overlap between $\mathbb{F}$ and the query region, the higher the video relevance. It is also useful to differentiate between the videos which overlap with the query region for time intervals of different length. A video which captures the query region for a longer period will probably include more details about the region of interest and therefore can be more interesting to the user. Note that during the overlap period the amount of spatial overlap at successive time instances changes dynamically for each video. Among two videos whose total overlap amounts are comparable, one may cover a small portion of the query region for a long time and the rest of the overlap area only for a short time, whereas another video may cover a large portion of the query region for a longer time period. FIGS. 5a and 5b illustrate the overlap between the query $Q_{207}$ and the videos $V_{46}$ and $V_{108}$, respectively. Although the actual overlapped area of the query is similar for both videos, the coverage of $V_{108}$ is much denser. Consequently, among the two videos $V_{108}$'s relevance is higher.

In the following, how the overlap between the video FOVScenes and query regions is explained and three basic metrics for ranking video search results are disclosed. A summary of the symbolic notations used in the discussion is provided in Table 2.

TABLE 2

Summary of terms

| Term | Description |
|---|---|
| $\mathbb{F}$ | the short notation for FOVScene |
| P | camera location point |
| Q | a query region |
| $V_k$ | a video clip k |
| $V_k^F$ | a video clip k represented by a set of FOVScenes |
| $V_k^F(t_i)$ | a polygon shape FOV Scene at time $t_i$, a set of corner points |
| Q | a polygon query region represented by a set of corner points |
| $O(V_k^F(t_i), Q)$ | overlap region between $V_k^F$ and Q at $t_i$, a set of corner points |
| $R_{TA}$ | relevance score with Total Overlap Area |
| $R_D$ | relevance score with Overlap Duration |
| $R_{SA}$ | relevance score with Summed Area of Overlap Regions |
| Grid | M H N cells covering the universe |
| $V_k^G(t_i)$ | a FOVScene at time $t_i$ represented by a set of overlap grid cells between Grid and $V_k^F(t_i)$ |
| $V_k^G$ | a video clip k represented by a set of $V_k^G(t_i)$ |
| $Q^G$ | a polygon query region represented by a set of grid cells |
| $O^G(V_k^G(t_i), Q)$ | overlap region between $V_k^G$ and Q at $t_i$, a set of grid cells |
| $R_{TA}^G$ | relevance score using grid, extend of $R_{TA}$ |
| $R_D^G$ | relevance score using grid, extend of $R_D$ |
| $R_{SA}^G$ | relevance score using grid, extend of $R_{SA}$ |

Preliminaries: Let Q be a polygon shaped query region given by an ordered list of its polygon corners:

$$Q = \{(lon_j, lat_j), 1 \leq j \leq m\}$$

where $(lon_j, lat_j)$ is the longitude and latitude coordinate of the $j^{th}$ corner point of Q and m is the number of corners in Q. Suppose that a video clip $V_k$ consists of n $\mathbb{F}$ regions. $t_s$ and $t_e$ are the start time and end time for video $V_k$, respectively. The sampling time of the ith $\mathbb{F}$ is denoted as $t_i$. The starting time of a video $t_s$ is defined as $t_1$. The $i^{th}$ $\mathbb{F}$ represents the video segment between $t_i$ and $t_{i+1}$ and the $n^{th}$ $\mathbb{F}$, which is the last FOVScene, represents the segment between $t_n$ and $t_e$ (for convenience, say $t_e = t_{n+1}$). The set of FOVScene descriptions for $V_k$ is given by $V_k^F = \{F^{V_k}(t_i, P, \vec{d}, \theta, R) | 1 \leq i \leq n\}$. Similarly, the $\mathbb{F}$ at time $t_i$ is denoted as $V_k^F(t_i)$.

If Q is viewable by $V_k$, then the set of $\mathbb{F}$ that capture Q is given by $$SceneOverlap(V_k^F, Q) = \{V_k^F(t_i) | \text{ for all } i(1 \leq i \leq n) \text{ where } V_k^F(t_i) \text{ overlaps with } Q\}$$

Figure 7:
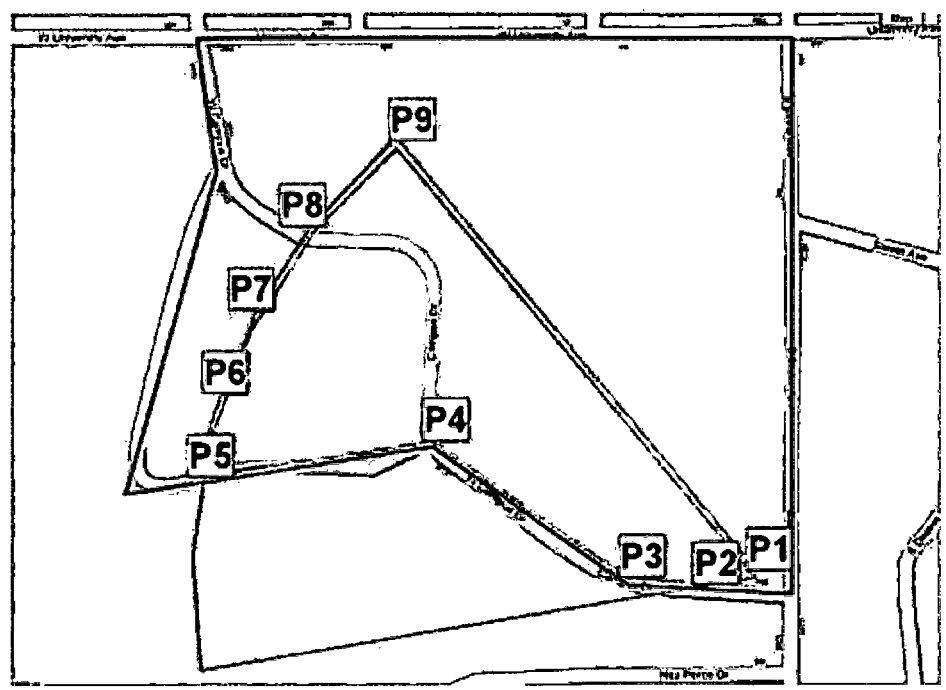
FIG. 7 is the overlap between a video FOCScene and a polygon query.

The overlap between $V_k^F$ and Q at time t, forms a polygon shaped region, as shown in FIG. 7. Let $O(V_k^F(t_i), Q)$ denote the overlapping region between video $V_k^F$ and query Q at time $t_i$. It is defined as an ordered list of corner points that form the overlap polygon. Therefore, $$O(V_k^F(t_i), Q) = OverlapBoundary(V_k^F(t_i), Q) \quad (1)$$

$$= \{(lon_j^{t_i}, lat_j^{t_i}), 1 \leq j \leq m\}$$

where m is the number of corner points in $O(V_k^F(t_i), Q)$. The function OverlapBoundary returns the overlap polygon which encloses the overlap region. In FIG. 7, the corner points of the overlap polygon are shown with labels P1 through P9. Practically, when a pie-shaped $\mathbb{F}$ and polygon shaped Q intersect, the formed overlap region does not always form a polygon. If the arc of $\mathbb{F}$ resides inside Q, part of the overlap region will be enclosed by an arc rather than a line. Handling such irregular shapes is usually impractical. Therefore the part of the arc that resides within the query region Q can be estimated with a piece-wise linear approximation consisting of a series of points on the arc such that each point is 5° apart from the previous and next point with respect to the camera location. OverlapBoundary computes the corner points of the overlap polygon where: (i) a corner of the query polygon Q is enclosed within $\mathbb{F}$ or (ii) the camera location point is enclosed within Q or (iii) an edge of the query polygon Q crosses the sides of the $\mathbb{F}$ or (iv) part of the $\mathbb{F}$ arc is enclosed within Q (the intersecting section of the arc is estimated with a series of points). Further details about the implementation of the OverlapBoundary algorithm can be found in the extended technical report.

Three Metrics to Describe the Relevance of a Video: Three fundamental metrics may be used to describe the relevance (R) of a video $V_k$ with respect to a user query Q as follows:

1. Total Overlap Area ($R_{TA}$). The area of the region formed by the intersection of Q and $V_k^F$. This quantifies what portion of Q is covered by $V_k^F$, emphasizing spatial relevance.
2. Overlap Duration ($R_D$). The time duration of overlap between Q and $V_k^F$ in seconds. This quantifies how long $V_k^F$ overlaps with Q, emphasizing temporal relevance.
3. Summed Area of Overlap Regions ($R_{SA}$). The summation of the overlap areas for the intersecting FOVScenes during the overlap interval. This strikes a balance between the spatial and temporal relevance.

Figures 6A, 6B:
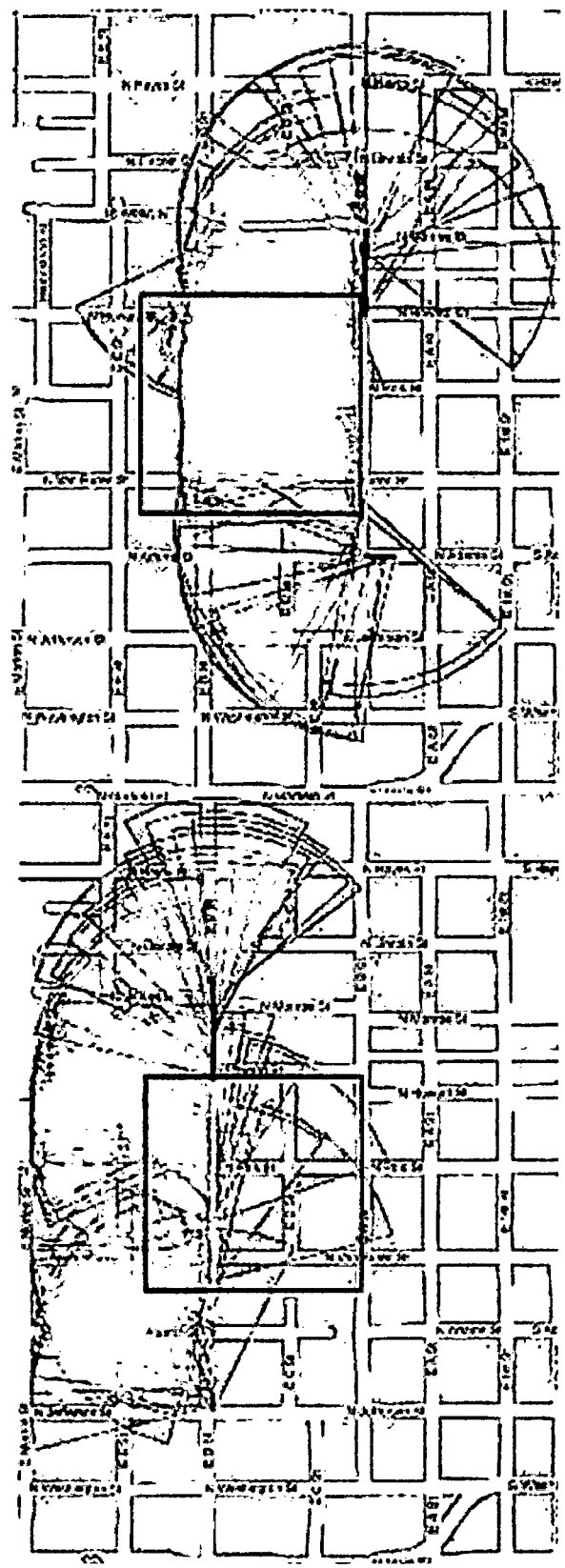
FIG. 6A is a visualization of the overlap regions between query $Q_{207}$ and video $V_{46}$.
FIG. 6B is a visualization of the overlap regions between query $Q_{207}$ and video $V_{108}$.

Total Overlap Area ($R_{TA}$): The total overlap area of $O(V_k^F, Q)$ is given by the smallest convex polygon which covers all overlap regions formed between $V_k^F$ and Q. This boundary polygon can be obtained by constructing the convex envelope enclosing all corner points of the overlap regions. Equation 5 formulates the computation of the total overlap coverage. The function ConvexHull provides a tight and fast approximation for the total overlap coverage. It approximates the boundary polygon by constructing the convex hull of the polygon corner points, where each point is represented as a +longitude, latitude, pair. FIG. 6 shows examples of the total overlap coverage between the query $Q_{207}$ and videos $V_{46}$ and $V_{108}$. The total overlap area is calculated as follows.

$$O(V_k^F, Q) = ConvexHull\left(\bigcup_{i=1}^{n} \{O(V_k^F(t_i), Q)\}\right) \quad (2)$$

$$= ConvexHull\left(\bigcup_{i=1}^{n} \bigcup_{j=1}^{|O(V_k^F(t_i),Q)|} \{(lon_j^{t_i}, lat_j^{t_i})\}\right)$$

Subsequently, the Relevance using Total Overlap Area ($R_{TA}$) is given by the area of the overlap boundary polygon $O(V_k^F, Q)$, computed as:

$$R_{TA}(V_k^F, Q) = Area(O(V_k^F, Q)) \quad (3)$$

where function Area returns the area of the overlap polygon $O(V_k^F, Q)$. A higher $R_{TA}$ value implies that a video captures a larger portion of the query region Q and therefore its relevance with respect to Q can be higher.

Overlap: Duration ($R_D$). The Relevance using Overlap Duration ($R_D$) is given by the total time in seconds that $V_k^F$ overlaps with query Q. Equation 7 formulates the computation of $R_D$.

$$R_D(V_k^F \cdot Q) = \sum_{i=1}^{n} (t_{i+1} - t_i) \text{ for } i \text{ when } O(V_k^F(t_i), Q) \neq 0 \quad (4)$$

$R_D$ is obtained by summing the overlap time for each F in $V_k^F$ with Q. The overlap time for each F may be estimated as the difference between timestamps of two sequential F s. When the duration of overlap is long, the video will capture more of the query region and therefore its relevance will be higher. For example, a camera may not move for a while, hence the spatial query overlap will not change but the video will most likely be very relevant.

Summed Area of Overlap Regions ($R_{SA}$):

Total Overlap Area and Overlap Duration capture the spatial and temporal extent of the overlap respectively. However both relevance metrics express only the properties of the overall overlap and do not describe how individual FOVScenes overlap with the query region. For example, in FIG. 6, for videos $V_{46}$ and $V_{108}$, although $R_{TA}$ ($V_{46}^F$, $Q_{207}$)≅$R_{TA}$ ($V_{108}^F$, $Q_{207}$) and $R_D$ ($V_{46}^F$, $Q_{207}$) $R_D$ ($V_{108}^F$, $Q_{207}$), $V_{108}^F$ overlaps with around 80% of the query region $Q_{207}$ during the whole overlap interval, whereas $V_{46}^F$ overlaps with only 25% of $Q_{207}$ for most of its overlap interval and overlaps with 80% of $Q_{207}$ only for the last few FOVScenes. In order to differentiate between such videos, the Relevance using Summed Overlap Area (RSA) may be used as the summation of areas of all overlap regions during the overlap interval. The following equation formalizes the computation of $R_{SA}$ for video $V_k^F$ and query Q.

$$R_{SA}(V_k^F, Q) = \sum_{i=1}^{n} (\text{Area}(O(V_k^R(t_i), Q)) * (t_{i+1} = t_i)) \quad (5)$$

Here, function Area returns the area of the overlap polygon $O(V_k^F(t_i), Q)$. The summed overlap area for a single F is obtained by multiplying its overlap area with its overlap time. Recall that the overlap time for each F is estimated as the difference between timestamps of two sequential F s. The summation of all summed overlap areas for the overlapping Fs provides the $R_{SA}$ score for the video $V_k^F$.

Ranking Videos Based on Relevance Scores

---

Algorithm 1 [$R_{TA}$,$R_{SA}$,$R_D$]=CalculateRankScores(k, Q)

1:   Q ← Given convex polygon shaped query region
2:   k ← Video id
3:   $V_k^F$ = Load($V_k$) {Load FOVScene descriptions from disk}
4:   n = |$V_k^F$| {n is the number of FOVScenes $V_k^F$}
5:   $M = \bigcup_{i=1}^{n} MBR(V_k^F(t_i))$ {M is the MBR that encapsulates the whole video file}
6:   if RectIntersect(M, Q) is true then {Filter step 1}
7:     for i ← 0 to (n−1) do

---

Algorithm 1 [$R_{TA}$,$R_{SA}$,$R_D$]=CalculateRankScores(k, Q)

8:       $M_1$ = MBR($V_k^F(t_i)$)
9:       if RectIntersect($M_1$,Q) is true then {Filter step 2}
10:        if SceneIntersect(Q, $V_k^F(t_i)$) is true then {Filter step 3}
11:         Opoly = OverlapBoundary($V_k^F(t_i)$, Q)
12:         $R_{TA}$poly ∪ = Opoly
13:         $R_{SA}$ + = Area(Opoly)*($t_{i+1} - t_i$)
14:         $R_D$ + = ($t_{i+1} - t_i$)
15:        end if
16:       end if
17:      end for
18:   end if
19:   $R_{TA}$ = Area(convexhull($R_{TA}$poly))

---

Algorithm 1 outlines the computation of the proposed relevance metrics $R_{TA}$, $R_{SA}$, and $R_D$ for a given video $V_k$ and query Q. Note that the relevance score for $V_k$ is computed only when $V_k^F$ overlaps with Q. In Algorithm 1, a tri-level filtering step (lines 6, 9 and 10) may be applied to effectively eliminate the irrelevant videos and video segments. First, the algorithm checks whether query Q overlaps with the MBR enclosing all $V_k^F$. If so, the algorithm looks for the F regions whose MBR overlap with Q. And finally, the algorithm further refines the overlapping F regions by checking the overlap between query Q and actual $V_k^F$. Such a filtering process improves computational efficiency by gradually eliminating the majority of the irrelevant video sections. Algorithm 1 calls the subroutine MBR which computes the minimum bounding rectangle for a given F region. Functions RectIntersect(M, Q) and SceneIntersect (Q, $V_k^F(t_i)$) return true if the given query Q overlaps with the rectangle M or the FOVScene $V_k^F(t_i)$, respectively.

These proposed metrics describe the most basic relevance criteria that a typical user will be interested in. $R_{TA}$ defines the relevance based on the area of the covered region in query Q whereas $R_D$ defines relevance based on the length of the video section that captures Q. $R_{SA}$ includes both area and duration of the overlap in the relevance calculation, i.e., the larger the overlap is, the bigger the $R_{SA}$ score will be. Similarly, the longer the overlap duration, the more overlap polygons will be included in the summation. Since each metric bases its relevance definition on a different criteria, it may not be expected to obtain a unique ranking for all three metrics. Furthermore, without feedback from users it is difficult to ascertain whether one of them is superior to the others. However, a certain metric provides the best ranking when the query is specific in describing the properties of videos that the user is looking for. As an example, in video surveillance systems, the videos that give the maximum coverage extent within the query region will be more relevant. Then, metric $R_{TA}$ will provide the most accurate ranking. In real estate applications, users often would like to see as much detail as possible about the property and therefore, both extent and time of coverage are important. In such applications metric $R_{SA}$ will provide a good ranking. And in traffic monitoring systems, where the cameras are mostly stationary, the duration of the video that captures an accident event will be more significant in calculating relevance. Therefore, metric $R_D$ will produce the best ranking.

Based on the query specification either a single metric or a combination of the three can be used to obtain the video ranking. Calculating the weighted sum of several relevance metrics (Equation 9) is a common technique to obtain an ensemble ranking scheme.

$$\text{Relevance}(V_k^F,Q)=w_1 R_{TA}(V_k^F,Q)+w_2 R_D(V_k^F,Q)+w_3 R_{SA}(V_k^F,Q) \quad (6)$$

To obtain the optimal values for weights $w_1$, $w_2$ and $w_3$ a training dataset which provides an optimized ranking based on several metrics is needed. However constructing a reliable training dataset for georeferenced videos is not trivial and requires careful and tedious manual work. There is extensive research on content based classification and ranking of videos using Support Vector Machines (SVM) and other classifiers, which train their classifiers using publicly available evaluation data (for example the TRECVID benchmark dataset). There is a need for a similar effort to create public training data for georeferenced videos.

The visual content of the videos can be leveraged into the ranking process to improve the ranking accuracy. For example, for the Kibbie Dome query, the video segments in the search results might be analyzed to check whether the view of the camera is occluded with some objects such as trees, cars, etc. Some state-of-the-art concept detectors can be adopted to identify such objects within the video content. The video frames where the camera view is occluded can be weighted less in calculating the spatial and temporal overlap for the metrics $R_{T4}$, $R_{SA}$ and $R_D$. In addition to content based features, text labels extracted from video filenames, surrounding text and social tags can be useful in video ranking.

A Histogram Approach for Calculating Relevance Scores:

The ranking methods calculate the overlap regions for every overlapping FOVScene to obtain the video relevance scores. Since the overlap region computation is computationally expensive these techniques are often not practical for large scale applications. Thus, several histogram based ranking techniques that provide comparable ranking results are also introduced, but at the same time dramatically improve the query response time. Using a predefined grid structure, a histogram pre-computes and stores the amount of overlap between a video's FOVScenes and the grid cells. During query execution only the histogram data is accessed and queried.

Histogram based ranking techniques not only enable faster query computation, but also provide additional information about how densely the video overlaps with the query. For example, although the exact shape of the overlap region is calculated for each individual $\mathbb{F}$, the computed relevance scores do not give the distribution of the overlap throughout the query region, i.e., which parts of the query region are more frequently captured in the video and which parts are captured only in a few frames. The distribution of the density of overlap can be meaningful in gauging a video's relevance with respect to a query and in answering user customized queries, therefore should be stored.

The histogram based relevance scores are analogous to precise relevance scores except that precise ranking techniques calculate the overlap amounts for every user query whereas histogram based techniques use the pre-computed overlap information to obtain the rankings.

The whole geospace may be partitioned into disjoint grid cells such that their union covers the entire service space. Let Grid=$\{c_{i,j}: 1 \le i \le M$ and $1 \le j \le N\}$ be the set of cells for the M H N grid covering the space. Given the $\mathbb{F}$ descriptions $V_k^F$ of video $V_k$, the set of grid cells that intersect with a particular $V_k^F(t_i)$ can be identified as:

$$V_k^G(t_i) = \{C_{m,n} : C_{m,n} \text{ overlaps with } V_k^F(t_i) \text{ and } C_{m,n} \in \text{Grid}\} \quad (7)$$

$V_k^G(t_i)$ is the set of overlapping grid cells with $V_k^F(t_i)$ at time $t_i$, i.e., a grid representation of an $\mathbb{F}$. To obtain $V_k^G(t_i)$, the method searches for the cells that overlap with the borderline of $V_k^F(t_i)$ and then include all other cells enclosed between the border cells. The implementation details for computing $V_k^G$ can be found in the extended technical report. Then, $V_k^G$ is a grid representation of $V_k^F$ which is a collection of $V_i^G(t_i)$, $1 \le i \le n$. The histogram for $V_k^G$, denoted as $OH_k$, consists of grid cells $C_k = \cup_{i=1}^n V_k^G(t_i)$.

For each cell $c_j$ in $C_k$, OverlapHist counts the number of $\mathbb{F}$ samples that $c_j$ overlaps with. In other words, it calculates the appearance frequency ($f_j$) of $c_j$ in $V_k^G$ (Equation 11).

$$f_j = \text{OverlapHist}(c_j, V_k^G) = \text{Count}(c_j, \{V_k^G(t_i): \text{ for all } i, 1 \le i \le n\}) \quad (8)$$

Function Count calculates the number of $V_k^G(t_i)$ that cell $c_j$ appears in. Note that OverlapHist describes only the spatial overlap between the grid and the video FOVScenes. However, in order to calculate the time based relevance scores the histogram that summarizes the overlap durations needs to be created. OverlapHistTime constructs a set of time intervals when cj overlaps with $V_k^G$. A set $I_j$ holds overlap intervals with cell $c_j$ and $V_k^G$ as pairs of <starting time, overlap duration>. Then, the histogram for $V_k^F$, i.e., $OH_k$, consists of grid cells each attached with a appearance frequency value and a set of overlapping intervals.

Example 1

The histogram of video clip $V_k$ is constructed as follows:

$$OH_k = \{\langle c_1, f_1, I_1\rangle, \langle c_2, f_2, I_2\rangle, \langle c_3, f_3, I_3\rangle\}$$

$$= \{\langle (2, 3), 3, \{(2, 8), (10, 7), (20, 5)\}\rangle,$$

$$\langle (3, 3), 1, \{(10, 7)\}\rangle, \langle (4, 3), 1, \{(10, 7)\}\rangle\}.$$

This histogram consists of three grid cells $c_1$, $C_2$, and $c_3$ appearing 3, 1, and 1 times in $V_k^G$, respectively. $c_1$ appears in three video segments. One starts at 2 and lasts for 8 seconds. Another at 10 for 7 seconds. The other starts at 20 and lasts for 5 seconds. $c_2$ appears once starting at 10 and lasts for 7 seconds. $c_3$ appears once starting at 10 and lasts for 7 seconds. FIG. 8A and FIG. 8B demonstrate two example histograms, where different frequency values within the histograms are visualized with varying color intensities.

The histogram-based implementation counts the number of overlaps between the Fs and grid cells, and therefore the histogram bins can only have integer values. Alternatively, for the histogram cells that partially overlap with the $\mathbb{F}$, floating point values that quantify the amount of overlap may be used. Allowing floating point histogram bins will improve the precision of the $R_{SA}^G$ metric by assigning lower relevance scores to the videos that partially overlap with the query region compared to those that fully overlap with the query. However, storage and indexing of floating point numbers might introduce additional computational overhead when the size of the histogram is fairly large. Also note that the gain in precision by allowing floating point histogram bins is highly dependent on the size of the histogram cells. The tradeoff between precision and performance should be explored through careful analysis. In order to obtain reliable results, the performance evaluations should be done using a large video dataset.

Execution of Geospatial Range Queries Using Histograms:

A given polygon shaped query region Q may be represented as a group of grid cells in geospace:

$$Q^G = \{\text{all grid cells that overlap with } Q\} \quad (9)$$

The definition of overlap region may be redefined as a set of overlapping grid cells ($O^G$) between $V_k^G$ and $Q^G$. Using the histogram of $V_k^G$ (i.e., $OH_k$), the overlapping grid cell set can be defined as:

$$O^G(V_k^G, Q^G) = \{(C_k \text{ of } OH_k) \cap Q^G\} \quad (10)$$

Note that the grid cells in $O^G$ inherit corresponding frequencies and intervals from $OH_k$.

Let $Q^G$ be a query region that consists of fthe grid cells, $Q^G = \{<2,2>, <2,3>, <3,2>, <3,3>\}$.

Then, the overlapping cells with the video in Example 1 become:

$$O^G(V_k^G, Q^G) = \{<(2,3), 3\{<2,8>, <10,7>, <20,5>\}>, <(3,3), 1\{<10,7>\}>\}.$$

Histogram Based Relevance Scores: Using the grid-based overlap region $O^G$, three proposed metrics are redefined as follows.

Total Overlap Cells ($R_{TA}^G$): $R_{TA}^G$ is the extent of the overlap region on $Q^G$, i.e., how many cells in $Q^G$ are overlapping with $V_k^G$. Thus, $R_{TA}^G$ is simply the cardinality of the overlapping set $O^G(V_l^G, Q^G)$. In Example 1, $R_{TA}^G = 2$.

Overlap Duration ($R_D^G$): The duration of overlap between a query $Q^G$ and $V_k^G$ can be easily calculated using the interval sets in $OH_k$: OverlapHistTime.

$$R_D^G(V_k^G, Q^G) = \text{CombineIntervals}(OH_k) \quad (11)$$

Function CombineIntervals combines the intervals in the histogram. Note that there may be time gaps when the intervals for some of the cells are disjoint. There are also overlapping time durations across cells. In Example 1, $R_D^G = 20$ seconds.

Summed Number of Overlapping Cells ($R_{SA}^G$): $R_{SA}^G$ is the total time of cell overlap occurrences between $V_k^G$ and $Q^G$ and therefore is a measure of how many cells in $Q^G$ are covered by video $V_k^G$ and how long each overlap cell is covered. Since the histogram of a video already holds the appearance frequencies (f) of all overlapping cells, RS becomes:

$$R_{SA}^G(V_k^G, Q^G) = \sum_{i=1}^{|O^G(V_k^G, Q^G)|} \sum_{j=1}^{f_i} \text{SumIntervals}(c_i, I_j) \quad (12)$$

where SumIntervals adds all intervals of an overlapping grid cell a. In Example 1, $R_{SA}^G = 27$.

As mentioned above, a histogram gives the overlap distribution within the query region with discrete numbers. Knowing the overlap distribution is helpful for interactive video search applications where a user might further refine the search criteria and narrow the search results.

Energy-Efficient Mobile Video Management Using Smartphones

Power Model; An estimation model is defined to describe the power levels of a mobile device operating under different modes. The target device is the HTC G1, a smartphone that is based on the open source Google Android mobile device platform.

Modeled Hardware Components: The power estimation model is adapted. A linear-regression-based power estimation model is proposed, which uses high-level measurements of each hardware component on the mobile device, to estimate the total system power consumption. This model at the device level is used to understand and evaluate the efficiency and feasibility of the proposed video search technique.

Relevant details of each hardware component on the target HTC G1 mobile phone are described next. The search system incorporates an additional GPS receiver unit to obtain location meta-data. Therefore, the original model is adapted to include the power consumption for the GPS receiver.

CPU: The processor supports dynamic frequency scaling (DFS) and it is rated at 528 MHz, but is scaled down in the platform to run at 124 MHz, 246 MHz, and 384 MHz. The highest frequency of 528 MHz is not used. The lowest frequency is never used on consumer versions of the phone, and is too slow to perform basic tasks. Thus, only the high (384 MHz) and medium (246 MHz) frequencies are considered in the model. CPU power consumption is strongly correlated with the CPU utilization and frequency. CPU_hi and CPU_lo parameters represent the average CPU utilization while operating at 384 MHz and 246 MHz, respectively.

Screen: The display is described by two parameters: a boolean parameter LCD indicating whether the screen is on or off and a Brightness parameter which models the effect of the screen brightness with 256 uniformly spaced levels.

WiFi: The boolean parameter WiFi_on describes whether the WiFi network interface is turned on or off; additionally WiFi_trf and WiFi_bytes indicate network traffic and the number of bytes transmitted during a particular time interval.

Storage: The number of sectors transferred to or from the MicroSD flash memory card per time interval are represented by the parameter SD.

GPS: The boolean parameter GPS denotes the power consumption coefficient when the GPS receiver is on.

System: There exists also a residual power consumption parameter System. This parameter subsumes all power that is not accounted for the hardware components listed above. This is referred as the baseline System power.

Analytical Power Model: The described modeling parameters are incorporated into the analytical power model that is utilized in the simulation experiments. The power model determines the relationship between the system statistics (e.g., the value for screen brightness) and the power consumption for each relevant hardware component. The inputs to the model are the statistics collected from the device ($\beta_j$ values), and the output represents the total power consumption. The overall system power consumption as a function of time t is determined as follows:

$$P(t) = (C_{CPU\_hi} \times \beta_{CPU\_hi}(t)) + (C_{CPU\_lo} \times \beta_{CPU\_lo}(t)) + \\ (C_{LCD} \times \beta_{LCD}(t)) + (C_{Brightness} \times \beta_{br}(t)) + (C_{WiFi\_on} \times \\ \beta_{WiFi\_on}(t)) + (C_{WiFi\_trf} \times \beta_{WiFi\_trf}(t)) + (C_{WiFi\_bytes} \times \\ \beta_{WiFi\_bytes}(t)) + (C_{SD} \times \beta_{SD}(t)) + (C_{GPS} \times \beta_{GPS}(t)) + \\ (C_{System} \times \beta_{System}(t))$$

The overall power consumption is calculated by substituting the statistics collected at time t for the selected hardware components into P(t).

Validation of the Power Model:

To evaluate the accuracy of the power model, the power consumption of an HTC G1 is measured with Power-Tuto, an application for Android-based phones that displays the power consumed by major system components such as CPU, network interface, display, and GPS receiver (see FIG. 1). According to the authors, PowerTutor was developed on the HTC G1 in collaboration with Google, and its accuracy should be within 5% of actual values for the G1.

With PowerTutor the various β-statistics is obtained for different hardware units. Specifically, logs is collected on a G1 phone for different usage scenarios. For instance, video for one minute is captured or uploaded. During the tests, all non-essential processes were disabled. After multiple experiments, the values were determined and shown in Table 3.

TABLE 3

β-parameters under different operational modes.

| Hardware | Parameter | Video Capture | WiFi Transmission |
|---|---|---|---|
| CPU | $\beta_{CPU\_hi}$ | 77.45 | 77.33 |
|  | $\beta_{CPU\_lo}$ | 0 | 0 |
| LCD | $\beta_{LCD}$ | 1 | 0 |
|  | $\beta_{br}$ | 102 | 0 |

In the next step, the measured parameters were substituted into the power model. Same usage scenarios is performed with the Android G1 phone for about two minutes, and the trace logs from PowerTutor is collected. The power consumption is measured for various phone usage scenarios such as capture+GPS (capturing video and using GPS to obtain location information), capture+WiFi (capturing video and using WiFi to obtain the location), capture+GSM (capturing video and using GSM to obtain the location), and transmission+WiFi (transmitting data via WiFi). Grouped by usage scenario, the average power consumption obtained from the power model was compared to the power values reported by PowerTutor. The results are shown in FIG. 2.

The modeled and measured power consumptions match very well for each of the usage scenario. To calculate the accuracy of the model, he following error metric e is used:

$$e = \left| \frac{P_{measured} - P_{modeled}}{P_{measured}} \right| \quad (13)$$

The results indicate that the power estimation model accurately predicts the system-level power consumption. The error e for each scenario is less than 4.9%, and the average error across all the scenarios is 1.7%.

An important point to note is that capturing video and then transmitting it through WiFi are both very energy-consuming activities. With its standard 1,150 mAh-capacity battery, the G1 phone would last less than three hours in the worst case, when continuously capturing and transmitting video. The proposal is to extend battery life through more selective transmissions.

FIG. 31 shows an overview of the proposed system. Mobile nodes collect the videos and the sensor-associated meta-data such as GPS location, compass direction, capture time and other camera-related information. The video files remain locally on the device until requested while the meta-data are immediately uploaded to the server in real-time where they are stored and indexed in a database. In a typical search scenario, other users (e.g., observers) can query the videos that are being captured from many devices in real-time or near real-time. It is assumed that a user provides a query as a geographical region of interest. The video meta-data stored on the server are searched to identify and retrieve the video clips that show the requested query region and the search results are presented to the user. During query processing, the video content already available on the server is immediately sent to the user for viewing while the missing video segments are requested on demand from the mobile devices that captured the videos. Note that only the precisely delimited parts (i.e., only the video segments that actually overlap with the query region) are retrieved. The complete video content may be uploaded later when the device is in contact with a faster network connection.

The present embodiments may save considerable battery energy by delaying the costly transmission of the large binary video data that have not been requested, especially when the transmission speed is low.

Data Acquisition and Upload:

A camera positioned at a given point P in geo-space captures a scene whose covered area is referred to as the camera field-of-view (FOV, also called the viewable scene). The FOV model describes a camera's viewable scene in 2D space with parameters: camera location P, camera orientation a, viewable angle θ and visible distance R:

$$FOV = (P, \alpha, \theta, R) \quad (14)$$

The camera position P consists of the latitude and longitude coordinates read from a positioning device (e.g., GPS) and the camera direction a is obtained based on the orientation angle provided by a digital compass. R is the maximum visible distance from P at which a large object within the camera's field-of-view can be recognized. The angle θ is calculated based on the camera and lens properties for the current zoom level. The collected meta-data streams are analogous to sequences of $(nid, vid, t_{FOV}, t_f, P, \alpha, \theta, R)$ tuples, where nid represents the ID of the mobile device, vid is the ID of the video file and $t_{FOV}$ indicates the time instant at which the FOV is recorded. The timecode associated with each video frame is denoted by $t_f$. In 2D space, the field-of-view of the camera at time forms a pie-slice-shaped area as illustrated in FIG. 4.

When a mobile device begins video capture, the GPS and compass sensors are turned on to record the location and orientation of the camera. The custom-written data-acquisition software fetches such sensor values as soon as new values are available. Video data are processed in real time to extract frame timecodes ($t_f$). The visible distance R is calculated based on the camera specifications. All collected meta-data (i.e., location, direction, viewable distance, frame timecode and video ID) are combined as a tuple and uploaded to the server.

An appropriate meta-data upload rate should be determined such that the server is updated immediately for realtime video search while the energy consumption for metadata uploads is minimized. Two policies are possible. First, the system may send the meta-data whenever it is generated. Second, it may buffer the meta-data locally and then send the accumulated data periodically. Such meta-data aggregation and delivery may utilize available network bandwidth more efficiently. For the first policy, since meta-data is always ready to be uploaded, its is assume that the WiFi interface is always on when recording. Whereas for the second policy, WiFi will be turned on and off periodically. Some startup energy is consumed when WiFi is turned on.

Another aspect is energy-efficient collection of location meta-data. GPS, WiFi and GSM pose a challenging tradeoff between localization accuracy and energy consumption. While GPS offers good location accuracy of around 10 m, it incurs a serious energy cost that can drain a fully charged phone battery very fast. WiFi and GSM-based schemes are less energy-hungry, however, they incur higher localization errors (approximately 40 m and 400 m, respectively). The current disclosure employs GPS-based and GPS-save strategies. GPS-based scheme refers to sampling GPS data periodically, while GPS-save uses a more complicated strategy. When the device orientation change is within a limited range, it is assumed that the device user does not change his/her moving direction, and the GPS receiver is turned off to save energy. Once the direction changes, the GPS receiver is turned on, reporting the current location. When meta-data with two consecutive GPS data points is uploaded, the device location can be interpolated between the two GPS locations on the server. With this method considerable energy can be saved.

Data Storage and Indexing:

This module implements a storage server that manages the video files and the associated meta-data streams. It separately stores the video content and the meta-data. The video files are linked to the meta-data streams by device ID (nid) and video ID (vid). Each FOV tuple in a meta-data stream includes a frame timecode $t_f$ that points to a particular frame within the video content. This ensures a tight synchronization between the two streams.

The server keeps a data structure nodeInfo for each mobile node, which includes the device MAC address, the unique device ID, and the IP address. While the storage server receives the meta-data from mobile devices, nid is added automatically to each FOV tuple. An additional binary tag (inServer) is maintained for each FOV tuple indicating whether the corresponding binary data of the video frame exists or not on the server. Spatial indices are built and maintained to facilitate the efficient search of FOVs.

Query Processing:

When a user issues a query, the video meta-data in the server is searched to retrieve the video segments whose viewable scenes overlap with the geographical region specified in the query. The query region can be a point, a line (e.g., a road), a poly-line (e.g., a trajectory between two points), a circular area (e.g., neighborhood of a point of interest), a rectangular area (e.g., the space delimited with roads) or a polygon area (e.g., the space delimited by certain buildings, roads and other structures).

Given a query Q, the query processing module returns a list of the video segments whose corresponding FOVs overlap with the query Q. Each video segment is identified with a tuple (nid,vid,$t_{start}$, $t_{end}$), where $t_{start}$ and $t_{end}$ are the timecodes for the first and last FOVs.

For each video segment in the query results, the query processor checks for the availability of the corresponding video content on the server. Recall that, the storage server keeps track of which video files are uploaded to the server and what parts of the meta-data they do belong to. For the FOVs with the inServer field set to 1, the corresponding video content is available on the server. And conversely, for those with the inServer field equal to 0 the video content is not available and therefore needs to be requested from the capturing mobile device. To acquire a missing video segment, a Video Request Message (VRM) is sent to the mobile device. A VRM message specifies the IP address of the target mobile device as well as the corresponding video ID and the beginning and ending timecodes for the requested video segment.

If the requested video with video ID vid is still available on the mobile device, the video segment from $t_{start}$ to $t_{end}$ is uploaded to the storage server. The inServer tags for the corresponding FOVs are set to 1. However, if the requested video cannot be located, the mobile device notifies the query processor by sending a Video does not Exist Message (VNEM). If no response is received from the device after n trials, the device is assumed to be turned off and the VRM message is dismissed. If the query processor can locate the videos for the search results on the server, it immediately sends the video data to the user. The video segments requested from the mobile devices are sent as soon as they arrive at the server.

Below is a sample specification of the data format (JSON format) that stores sensor meta-data.

```
{
    "format_version": "0.1",
    "video_id" : a uniquely identifiable video id",
    "owner_properties":{
        "id_type" : "google account",
        "id" :someone@google.com
    },
    "device_properties":{
        "SIM_id" : "an id taken from SIM card",
        "OS":"Android",
        "OS_version":"1.0",
        "firmware_version":"1.0"
    },
    "sensor_data":[
        {
            "location_array_timestamp_lat_long":[
                ["2010-03-18T07:58:41Z",1.29356,103.77],
                ["2010-03-18T07:58:46Z",1.29356,103.78]
            ]
        },
        {
            "sensor_array_timestamp_x_y_z":[
                ["2010-03-18T07:58:41Z",180.00,1.00,1.00],
                ["2010-03-18T07:58:46Z",181.00,1.00,1.00]
            ]
        }
    ]
}
```

To provide synchronization between meta-data and video streams, the duration, encoded date and time are extracted from the video. Timestamp information is then added to every sensor data record to establish the relationship between a video clip and its corresponding geo-sensor information. Time is represented in Greenwich Mean Time (GMT), to avoid time zone issues. Files include the timestamp as part of their filename to avoid ambiguity.

Estimating Position of Regions of Interest with Sensor-Rich Video

In one embodiment, a method of estimating the effective visible distance R includes the process of determining the distance to object or scene locations where one or many camera views are pointing. As used herein, the visable distance R may be referred to by terms such a location (or its grid cell representation on a 2D map) as region of interest. Such regions of interest may be part of an attraction or landmark or consist of a more diffuse area that contains no specific physical objects but may be of interest to users (e.g., a beautiful valley).

Figure 11:
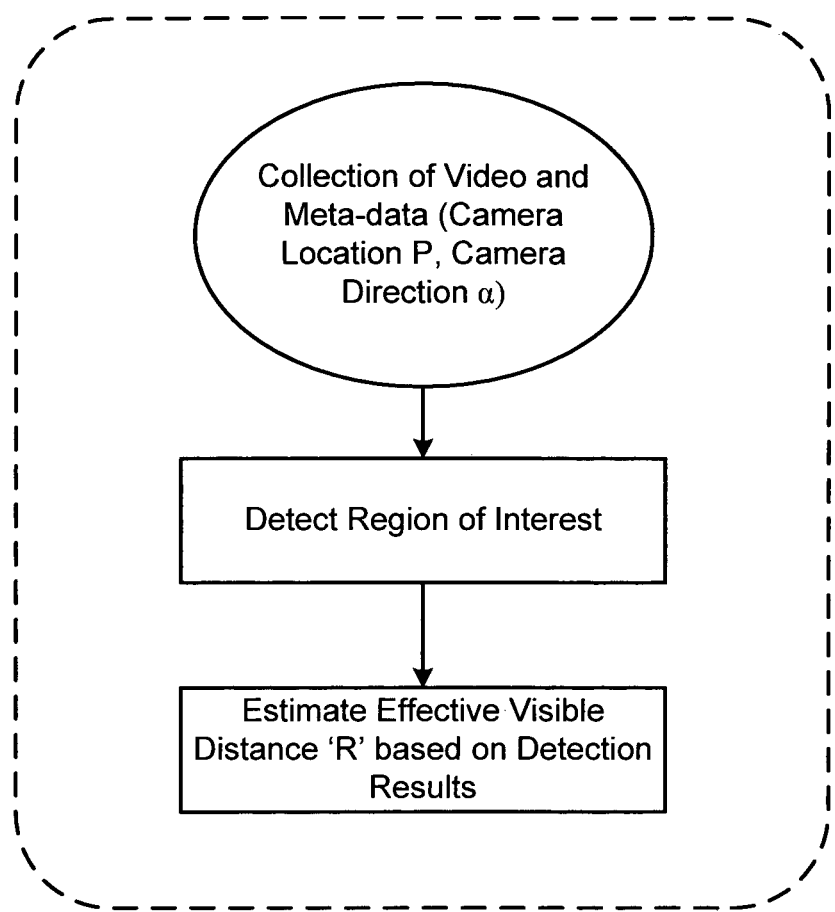
FIG. 11 is a schematic flow-chart diagram illustrating one embodiment of a method for detecting regions of interest and estimating effective visible distance values corresponding to the region of interest.

In one embodiment, regions of interest are detected from profiling of data collected from a large set of sensor recordings and then, the visible distances R are estimated between the camera and region of interest locations. An embodiment of this method is illustrated in FIG. 11. The framework utilizes the meta-data which may be collected with video frames to describe the geographic properties related to the camera view. One of ordinary skill in the art will recognize that multiple methods for determining a region of interest may exist. One such method generates a popularity map based on how often an area appears in different camera views and then identifies the most popular places. Another embodiment of a region of interest detection method computes the intersection points of all the camera views and then identifies the clusters inferred from this point cloud as region of interest. The effective visible distance R may be estimated by calculating the distance between camera locations and the closest region of interest.

Viewable Scene Model

A camera positioned at a given point P in geo-space captures a scene whose covered area is referred to as the camera field-of-view (FOV, also called the viewable scene). In one embodiment, the FOV model may describe a camera's viewable scene in 2D space by using four parameters: the camera location P, the camera orientation a, the viewable angle $\theta$ and the maximum visible distance $R^{max}$:

$$FOV \neq (P, \alpha, \theta, R^{max}) \qquad (15)$$

The camera position P may include the latitude and longitude coordinates read from a positioning device (e.g., GPS sensor) and the camera direction a is obtained based on the orientation angle provided by a digital compass. $R^{max}$ is the maximum visible distance from P at which a large object within the camera's field-of-view can be recognized. The angle $\theta$ is calculated based on the camera and lens properties for the current zoom level. The collected meta-data streams consist of sequences of (nid, vid, $t_{FOV}$, $t_f$, P, $\alpha$, $\theta$) tuples, where nid represents the ID of the mobile device, vid is the ID of the video file and $t_{FOV}$ indicates the time instant at which the FOV was recorded. The timecode associated with each video frame is denoted by $t_f$.

In 2D space, the field-of-view of the camera at time $t_{FOV}$ forms a pie-slice-shaped area as illustrated in FIG. 4. To acquire sensor-annotated videos, a custom recording app for Android- and iOS-based smart-phones, or any other platform may be used. When a mobile device begins to capture video, the GPS and compass sensors are concurrently turned on to record the location and orientation of the camera. Data-acquisition software fetches such sensor values as soon as new values are available. Video data are processed in real-time to extract frame timecodes ($t_f$). All collected meta-data (i.e., location, direction, frame timecode and video ID) are combined as a tuple and stored for later uploading to a server.

Figure 12A:
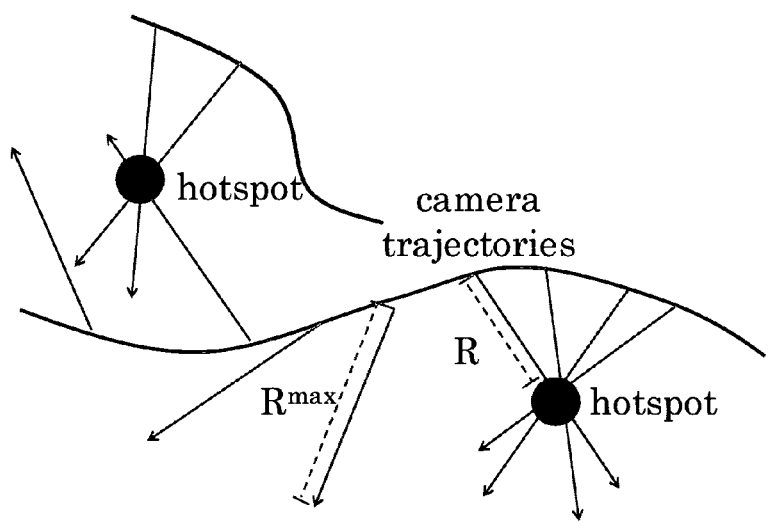
FIG. 12A is a conceptual illustration of visible distance estimation.

FIG. 12A illustrates the concept of visible distance R estimation based on region of interest. Along the camera trajectory (black line segments), the camera views (blue arrows) tend to point to some areas (red circles) more frequently, and R can be determined as the distance between such popular areas, i.e., region of interest, and the camera locations.

Region of Interest Detection

Multiple approaches for detecting region of interest may be used. For example, a first embodiment of a method utilizes a grid counting method to obtain a popularity distribution of FOVs. A second embodiment applies a clustering algorithm on a cloud of intersection points of the FOV center lines.

The target space is assumed to be a 2D geographical map (i.e., $G = \mathbb{R}^2$). Let the sensor measurement results be expressed as sets of data of D=$d_1$, . . . , $d_n$, where each $d_t$ is a multi-dimensional observation consisting of GPS coordinates, compass direction angles, etc.

Grid-Based Region of Interest Detection.

The target space is first partitioned into equally-spaced square grid cells g. Assuming $H \subset G$ is the set of region of interest given D, then the probability that a grid cell g is a region of interest given the sensor observations is expressed as p(g ∈ H|D), or simply p(h|D).

To obtain the posterior probability p(g|D) a grid counting-based popularity method may be used. Unlike existing popularity estimation methodologies for geo-tagging, where GPS locations are typically used as the popularity measure, embodiments of the present invention may leverage the visual coverage model conveyed by the field-of-view of a camera, because the camera position may be displaced from the area or location in which users are actually interested in when recording video. In such an embodiment, if an area is pointed to by cameras more often, it will more likely be a region of interest. As illustrated in FIG. 12A, regions of interest tend to be pointed to, or experience overlap from, many camera FOVs. One situation needs to be specially handled, namely when important objects are located across from each other and hence camera direction vectors coincidentally intersect in an area between the actual region of interest—see the example in FIG. 12B. Such areas are termed as "phantom region of interest".

The algorithm maintains a 2-dimensional data structure representing every map grid cell and containing a monotonically increasing counter of interest. Without prior knowledge of the underlying landmarks or attractions, the counter is incremented whenever its grid cell is visually covered by an FOV. Two visual coverage models are investigated: a sector-based coverage model and a line-based model. The sector-based coverage model uses an FOV that is abstracted as a sector whose maximal visual distance is $R^{max}$ (e.g., 1 km). As illustrated in the FIG. 13A, the counter of all the grid cells that overlap partially or fully with the sector is increased. Since this exhaustive coverage is time-consuming to process, a lightweight solution is introduced, namely a center-line-based coverage model. It uses a line vector with length $R^{max}$, whose origin coincides with the GPS location and whose heading is the camera direction—see FIG. 13B. With this model only the counters of the grid cells that intersect with the center vector is incremented. The rationale for this approach is that the main focus of interest in videos is often on objects located in the center of the frame or the FOV.

Using either of these coverage models, a posterior popularity probability for every grid cell is generated, p(g|D), by normalizing the counters as follows $$p(g \mid D) = \frac{c_g}{\sum_{d_j \in D} s_j},$$

where $c_g$ is the counter of grid cell g and $s_j$ is the number of grid cells affected by each coverage model generated by the sensor measurement d. Without any loss of generality, the posterior probability is used as the counter value interchangeably.

Among all the grid cells, the local maxima are computed across the map and are identified as region of interest if their probability is higher than those of all their neighboring cells and the difference exceeds a certain threshold (K)

$$P(g=h|D) \geq K + p(i \oplus D), i \in N_g,$$

where $N_g$ is the set of g's neighboring cells.

Cluster-Based Region of Interest Detection:

As is illustrated in FIG. 12A, an intuitive way to detect region of interest is to use the intersection points of the center vector of FOVs. All the intersection points together form a point cloud on which a clustering algorithm can be applied to obtain clusters as the detected region of interest. However, this method suffers from a major performance issue due to the generally large number of intersection points. Hence, a pre-processing procedure is proposed to reduce the number of input points for the clustering algorithm.

The center line of FOV $d_k$ is separated into m segments $d_k^1, \ldots, d_k^m$ of equal length $R^{max}/m$. Next, the intersection points of segment $d_k$ with all the other center lines is calculated. The algorithm maintains a data structure for each segment containing a monotonically increasing counter of intersection points. Subsequently, for each center line it is represented as a curve to describe the distribution of the intersection points. To increase the signal-to-noise ratio (SNR), the curve is smoothed with a moving-average filter. Among all the segments of $d_k$ the local maxima of the curve are computed and their positions are identified as the points of interest of $d_k$. The rationale behind this operation is that the intersection points tend to crowd around the interesting points where the FOVs really focus on.

After collecting the interesting points for each center line, a density-based clustering algorithm, DBSCAN, is applied to detect region of interest regions. A number of clustering algorithms are available and the reasons DBSCAN is selected are as follows. (1) DBSCAN does not require the number of clusters to be selected in advance. (2) DBSCAN can find arbitrarily shaped clusters so that the method can identify irregularly shaped region of interest. (3) DBSCAN has a notion of noise suppression so that unpopular areas can be pruned. Finally, (4) DBSCAN is insensitive to the ordering of the input points.

Computational Complexity Analysis: It is considered that there are $N_f$ FOVs (sensor measurement results) in the target 2D space. For the grid-based method, the time complexity of computing the counters for $N_c$, grid cells covered by $N_f$ FOVs is $O(N_f)$. The complexity of computing the local maxima of the map is $O(N_c^2)$. Hence, the overall time complexity for the gird-based method is $$O(N_f) + O(CN_c^2)$$

For the clustering-based method, computing the intersection points of $N_f$ center lines of FOVs results in time complexity $O(N_f^2)$. Next, the local maxima along the m segments of each center line are computed, and the complexity for this operation is $O(N_f \times m)$. Assume for each center line there are $k(k<m)$ interesting points on average as input to the DBSCAN algorithm. Then the total number of input points is $O(k \times N_f)$ and the run time complexity for clustering is $O((k \times N_f)^2)$. Therefore, the overall time complexity for the clustering-based method is $$O(N_f^2) + O(N_f + m) + O((k \times N_f)^2) = O(N_f^2)$$

From the above analysis, it can be observed that when $N_f$ is much larger than $N_c$, the grid-based approach is much more efficient than the clustering-based method. On the other hand, when $N_f$ is much smaller than $N_c$, the clustering-based method is more efficient. Thus, the grid-based approach is more suitably applicable to dense areas with a lot of FOV data (which is the more frequent case), while the clustering-based method is best applied to sparse data areas.

Effective Visible Distance Estimation

Let H be a set of estimated region of interest computed from the previous stage. When new sensor values related to a camera view arrive in the system, they are transformed into a measurement vector $X=\{x_1, \ldots, x_{|H|}\}$, where $x_i$ consists of the subtended angle a of a compass direction to the region of interest $i \in H$ and the Euclidean distance d to the region of interest.

The effective visible distance estimation is based on the observation that a camera view tends to point to an interesting place more often than to an unattractive place. Therefore, this information can be leveraged to estimate the effective visible distance by the closeness—in terms of lower angular disparity and higher popularity rank—to a region of interest and select the closest one. The following equation expresses the effective visible distance as the distance to the region of interest which is most likely pointed to by a camera view, by choosing the minimum subtended angle along with a higher posterior popularity probability, i.e., $1-p(i|D)$:

$$\left\{ \underset{x_i}{\operatorname{argmin}}(x_i, a) \cdot (1 - p(i|D)) \right\}, d \qquad (16)$$

Figure 12B:
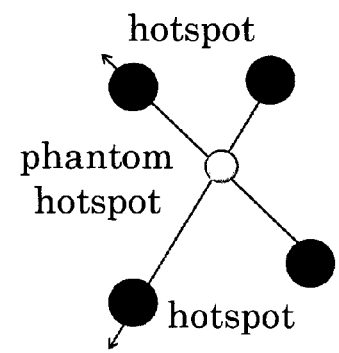
FIG. 12B illustrates a phantom region of interest.

This computation, however, may result in an incorrect decision because of the existence of phantom region of interest. As seen in FIG. 12B, a phantom region of interest should not be chosen as the closest region of interest, since it may be erroneous. Such phantom region of interest may be excluded with information from third-party landmark databases such as Google Maps or OpenStreetMap. However, such landmark information is generally only available for some highly popular areas.

To eliminate such unwanted phantom region of interest when no landmark databases are available, a cross-intersection elimination method may be used. This exhaustive technique is based on the observation that a phantom region of interest is generated by multiple cross-intersections by at least two lines of two independent region of interest. This implies that some candidate region of interest near the intersection points are highly likely to be phantom region of interest. Algorithm 1 outlines the method. It first creates all possible intersection points of two disjoint lines from a set of candidate region of interest (lines 2-9). If the intersection points and their corresponding region of interest are too close, they are discarded (lines 4-5). Next, the algorithm computes how far each region of interest is located from the intersection points and select some within a given threshold distance (lines 11-15). Finally, the algorithm recovers the region of interest that contribute to the elimination of other region of interest and return the remaining region of interest without any cross-intersections (lines 16-21).

Algorithm 1
Cross-Intersection Elimination Algorithm

Figure 14:
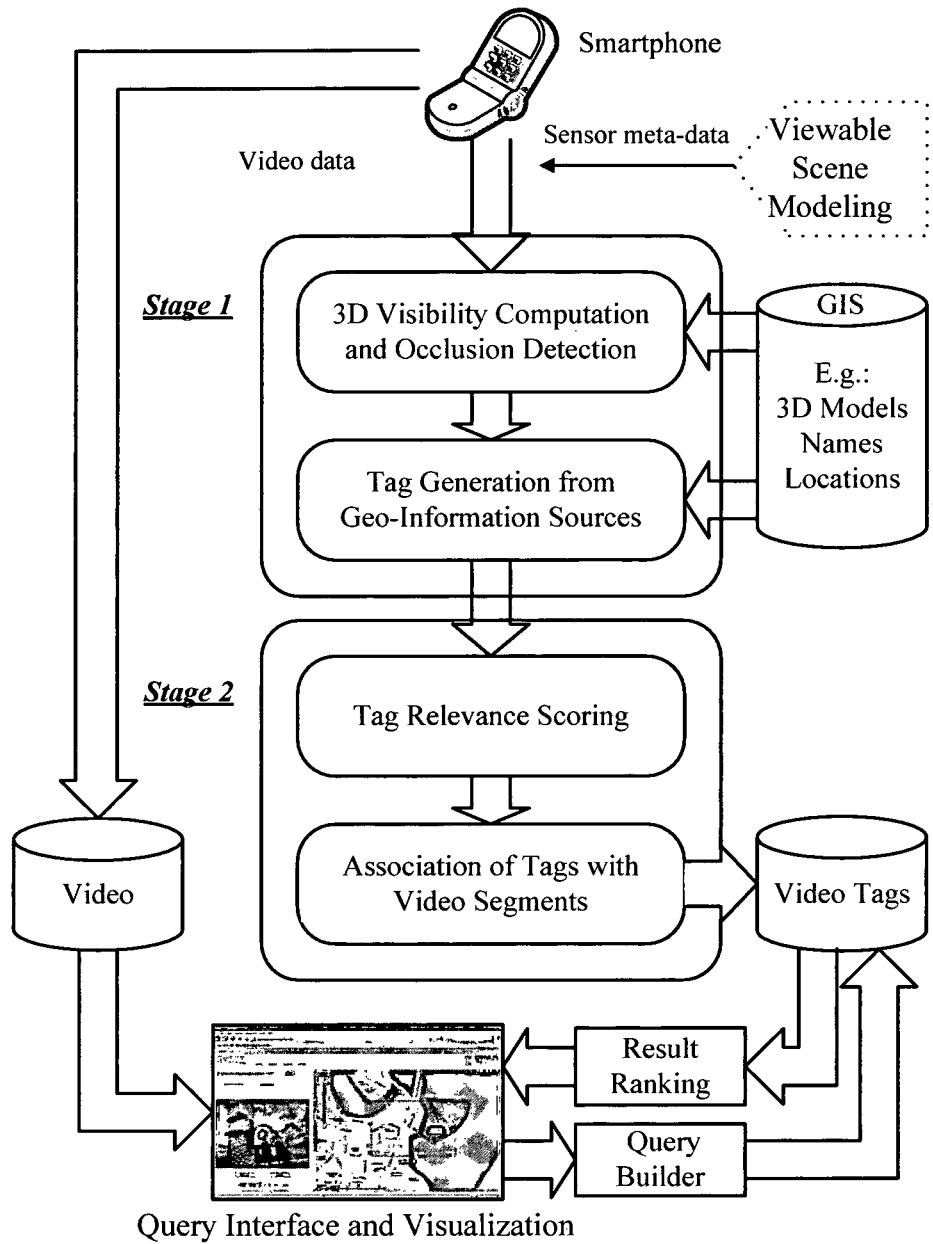
FIG. 14 is sensor meta-data collected together with sensor-rich video streams by the iPhone application. The XML encoded data includes timestamps, GPS coordinates (top fragment) and compass headings (bottom fragment).

Require: H: set of candidate hotspots, Th: a threshold
1: P ← ∅
2: for all different i, j, k, l ∈ H do
3:  p{i, j, k, l} = intersection($\overline{i, j}$, $\overline{k, l}$)
    ∪ intersection($\overline{i, k}$, $\overline{j, l}$)
    ∪ intersection($\overline{i, l}$, $\overline{j, k}$)
4:  if ∃ p ∈ p{i, j, k, l}, q ∈ {i, j, k, l} and ||p, q|| ≤ Th then
5:   continue
6:  else
7:   P ∪ = p{i, j, k, l}
8:  end if
9: end for
10: C ← ∅
11: for all i ∈ H, p ∈ P do
12:  if ||i, p|| ≤ Th then
13:   C+ = i, break
14:  end if
15: end for
16: for all c ∈ C do
17:  if ∃ p{..., c, ...} ∈ P then -continued Algorithm 1
Cross-Intersection Elimination Algorithm 18:    C- = c
19:    end if
20: end for
21: return H - C Automatic Tag Generation and Ranking FIG. 14 illustrates the overall architecture of the proposed tag generation approach and highlights its components. The system has two major processing stages which are outlined below. Users collect sensor-annotated videos with special recording apps and upload them to a server. The collected meta-data are utilized to describe the geographical coverage of the video scenes based on a viewable scene model. In the first stage, the object information for the covered geographical region are retrieved from various geo-information services and visible objects are identified through 3D visibility computations. Occlusion detection is performed to remove hidden objects. The system then generates descriptive textual tags based on the object information retrieved from the geo-information services, such as names, types, locations, dimensions, etc. Currently, tags are generated from a limited number of sources, but one of the benefits of this approach is that tag generation can be extended in many ways, for example by employing geo-ontologies, event databases and Wikipedia parsing techniques. In the second stage, six relevance criteria are introduced to score the tag relevance to the scenes, i.e., closeness to the FOVScene center, distance to the camera position, horizontally/vertically visible angle ranges/percentages of the object. Some attributes of the object information retrieved from the geo-information services are analyzed to identify the important landmarks. After scoring tag relevance, the video segments for which the tags are relevant to are determined. Unlike many other video tagging techniques, the system can associate tags precisely with the video sections in which they appear, rather than the whole video clip. Therefore, when a user searches videos for a certain tag, only those relevant video sections are returned. The ranked tags can be utilized by a video repository to allow search through textual keywords.

After videos and sensor metadata have been recorded, automatic video tagging can be applied. Given a set of geographic objects O for a region in geospace and a set of video files V with associated sensor meta-data M, effective algorithms are designed for the following steps: (1) determining the visible objects in video ViVi by querying O through the meta-data $M_i$ and extracting textual information about the visible objects to serve as tags, (2) scoring and ranking the tags based on the geospatial and temporal properties of their appearances in the video, and associating tags with the video segments where they appear.

Determination of Visible Objects in Videos

The first step is to determine which objects have been captured in the video. The viewable scene information calculated based on the sensor meta-data identifies the geographic region covered in the video. However in order to describe the video semantics, further information about the geographic objects in the captured scene needs to be acquired. These objects may include buildings, landmarks, roads, parks, mountains or any other geo-object that is associated with a location. In this system, information about these objects is retrieved from two geo-information services, namely OpenStreetMap and GeoDec. These systems provide sophisticated information, such as name, type, location, polygon outline and even a 3D model of the geographic objects in geo-space. These 3D models reproduce the visual scene of the real world. For example, captured videos may be compared to corresponding 3D models with a Google Earth interface. In order to determine the objects that appear captured video, the geo-information services may be queried and all the objects within a certain distance R around the camera location points may be retrieved. A custom R value can be applied to affect the level of detail required in the tagging process. Next, the objects that are within the videos' viewable scenes are extracted through geometrical computations. A considerable challenge is that determining the actually visible objects is not straightforward due to occlusions.

Figure 15A:
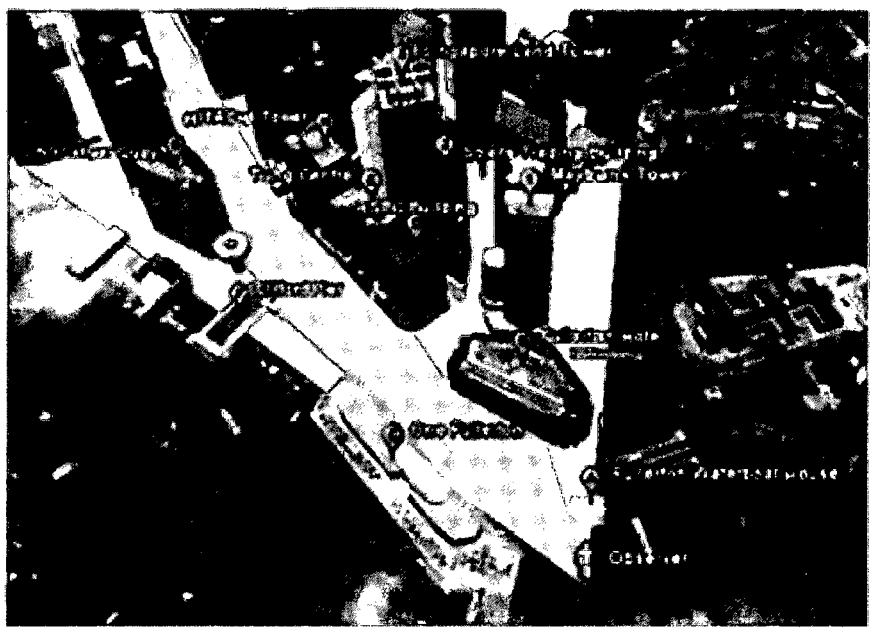
FIG. 15A illustrates the FOV Scene mapped in Google Earth

Visibility Determination Based on FOV Scene:

Defining 3D VISIBILITY QUERIES. FIG. 15A visualizes the viewable scene of the aforementioned video snapshot on Google Earth (the visible area is highlighted in blue while the occluded area is highlighted in yellow). Not all the objects are equally visible in the highlighted areas. The objects can be classified into three categories according to their visibility level:

Front Object: An object to which there exists a line-of-sight horizontal tracing ray from the camera location which does not intersect with any other objects (see FIG. 15B). The buildings labeled with alphabets belong to this category. In FIG. 15A, the front objects enclose the front area highlighted in blue.

Vertically Visible Object: An object which is not in the front but is vertically visible because its height exceeds what the front object is blocking. When the vertical viewable angle range of the object is wider than the angle of the object right in front of it, the object will be marked as vertically visible. The buildings labeled with numbers in FIG. 15A belong to this category. Note that an object can be vertically visible even behind several objects.

Occluded Object: An object which is neither front nor vertically visible, therefore it is completely occluded.

When the query algorithm retrieves objects within the viewable scene, the object set will also include occluded objects. Thus, a more sophisticated method is needed to retrieve the visible objects only. A 3D visibility query is disclosed. In the present disclosure, a method to determine the visible objects and their visible angle ranges when observing from a specific viewpoint is disclosed. One limitation of this technique is that the visibility computation is restricted within 2D space and is based only on the outline of the footprint of the objects. Therefore, the vertically visible objects will be considered as occluded by the front objects and will be eliminated. For example, when their method is applied, the Fullerton Hotel completely blocks the camera's sight to the skyscrapers in the back, which is not the case in reality as seen in FIG. 15A. Hence, the method may be extended to 3D space to satisfy the demands of the system.

A 3D visibility query takes an object set O and the sensor meta-data $M_i(t)$ (i.e., the camera location p and the camera viewable angle range [α, β] at time t) as inputs, and returns a set of the visible objects and their horizontally and vertically visible angle ranges $\{(o: [\mu_h, V_h], \mu_v, V_v])\}$. Notably, the algorithm not only obtains the visible objects, but also quantifies their degree of visibility with angle ranges, which will later be used for tag ranking.

Figure 15B:
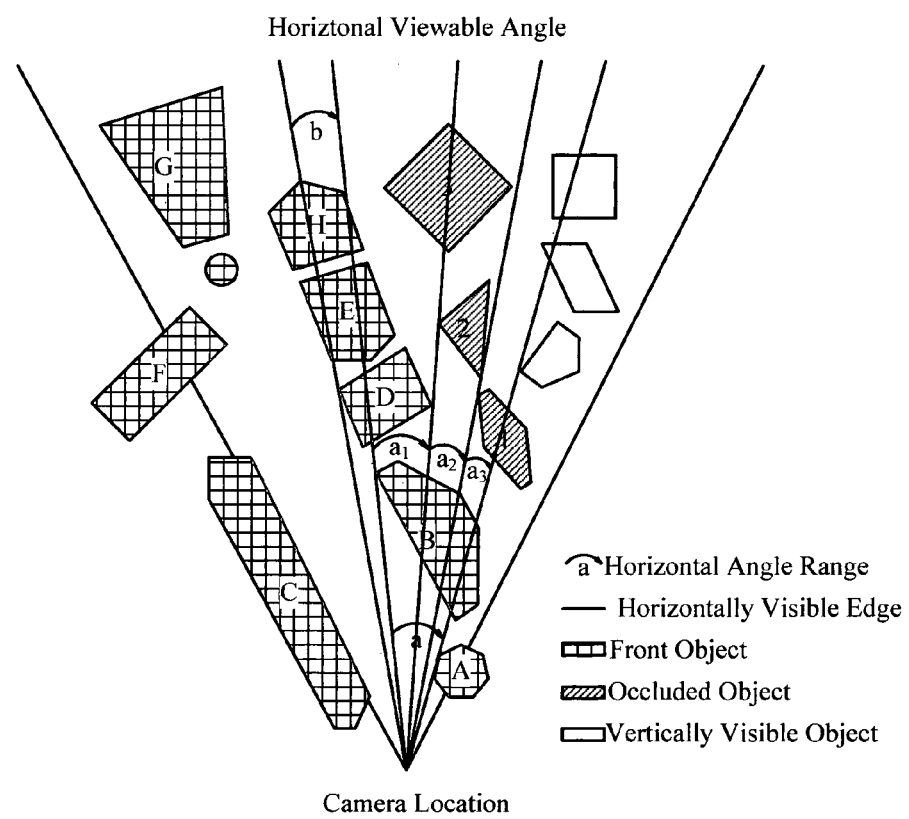
FIG. 15B illustrates a projection on a 2D plane corresponding to the FOV Scene of FIG. 15A.

Processing 3D Visibility Queries:

As illustrated in FIG. 15B, each visible object has a horizontal angle range (such as a for B and b for D), which indicates the visual width of it. However, a horizontal angle range may not only be associated with one visible object. For example, the non-front object 2 is also located in the range a. In a general case, since vertical visibility is considered as well, at an arbitrary horizontal angle value within [a, 1] there may exist multiple visible objects, which are sorted according to their horizontal occlusion, forming a visible object queue. Hence, an atomic horizontal angle range is defined, within which the visible object queue is the same at every angle value. In FIG. 15B, the range a is not atomic because there exist some angles whose visible object queues are different. On the other hand, the three sub-ranges of a are all atomic and respectively associated with unique object queues, i.e., ($\alpha_1$: {B, D, 3}), $\alpha_2$: {B, 2, 3}) and ($\alpha$:(B, 1).

Figure 16A:
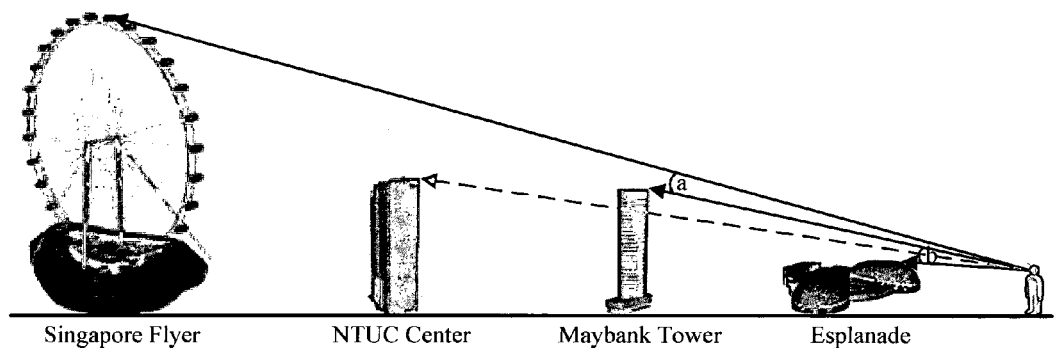
FIGS. 16A-B demonstrate a vertical occlusion.
Figure 16B:
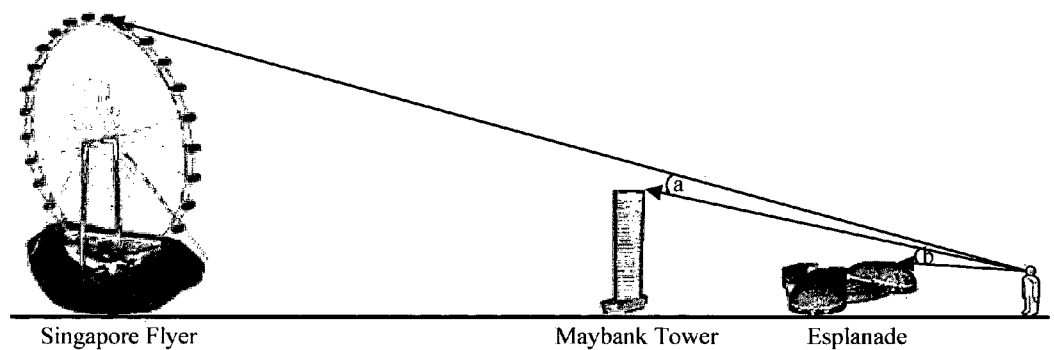

An incremental algorithm is disclosed to determine the queue of visible objects associated with an atomic range as follows. Initially the queue is empty. When a new object arrives, the algorithm will check the horizontal occlusion between the newcomer and the objects in the queue one-by-one, stopping at the first object that is horizontally occluded by the newcomer or at the queue tail. If the newcomer is not entirely vertically occluded, it will be inserted right before the last checked object or into the queue tail. Afterwards, the vertical visibility of the objects behind the newcomer will be checked, and the ones that are wholly occluded by the newcomer will be removed from the queue (e.g., the NTUC Center in FIG. 16A). The process will stop when no more objects can be added to the queue. The final result will consists of the objects that are sorted according to their horizontal occlusion and are visible to some extent. FIG. 16B shows an example of the result queue.

Algorithm 1 sketches the overall procedure of processing the 3D visibility query. To initialize the algorithm a mock object Ø is introduced, which is assumed to be infinitely far away from the camera and have zero height, so that it is always occluded by any object. First, for each object, the part of the horizontal angle range that is outside the camera viewable range is filtered from further computation to improve the performance. The camera viewable angle range [$\alpha$, $\beta$] is split into a number of atomic horizontal angle ranges, in each of which the candidate objects will be added to the corresponding queue according to both horizontal and vertical occlusion, as is described above. The procedure HorizontalOcclusion( ) implements the 2D horizontal occlusion proposed by Lee et al., while VerticalOcclusion( ) checks whether the object is entirely vertically occluded or not. At the end, the algorithm post processes the internal data structure and outputs the set of visible objects and their visible angle ranges, i.e., R={(o: [.$\mu_h$, $V_h$], [$\mu_o$,$V_v$])}.

Note that the visibility query outlined in Algorithm 1 returns the set of visible objects only for a single FOVScene. Hence, this query needs to be repeated for every FOVScene in the video.

Effects of Sensor Errors on Visibility The accuracy of the viewable scene calculation is somewhat dependent on the precision of the camera location and heading measurements obtained from the GPS and compass sensors. Zandbergen et al. evaluates the accuracy of locations obtained using different positioning modes on the 3G iPhone. The A-GPS locations, which is the measurement mode used in the iPhone recording software, achieves an average median error of 8m, which is small compared to the size of the viewable scene considered (e.g., at full zoom-out about 13,000 $m^2$ when R=300m). Additionally, there are techniques (e.g., Kalman filter) to manage uncertainty and accuracy issues from insufficient and inaccurate data. An error in the compass heading may be more significant. However, since the sensor metadata used in this study have a fine sampling granularity (1 sample/sec), the amount of overlap between two consecutive FOVs is usually large. The missing visible objects in some video frames due to errors in the compass readings will probably still appear in the adjacent frames. However, such errors might have a minor effect on the tag scores. But any false positives would have very low scores and be ignored in the final video tagging.

Algorithm 1: 3D Visibility Query Processor

Input: the camera location p and viewable range [$\alpha$, $\beta$]
the set of objects O = {o}
Output: the set of visible objects and their visible angle
ranges R = {(o:[$\mu_h$, $v_h$], [$\mu_v$, $v_v$])}
1  $R_{tmp}$ = {([$\alpha$, $\beta$]:{Ø})}
2  foreach o ∈ O do
3  |   [$\alpha_i$, $\beta_i$] = [$\alpha$, $\beta$] ∩ HorizontalRange (o)
4  |   if [$\alpha_i$, $\beta_i$] is empty then go to next loop
5  |   foreach ([$\alpha_j$, $\beta_j$]:$O_j$) ∈ $R_{tmp}$ do
6  |   |   [$\alpha_k$, $\beta_k$] = [$\alpha_i$, $\beta_i$] ∩ [$\alpha_j$, $\beta_j$]
7  |   |   if [$\alpha_k$, $\beta_k$] is empty then go to next loop
8  |   |   $R_{tmp}$ = $R_{tmp}$ − ([$\alpha_j$, $\beta_j$]:$O_j$)
9  |   |   O'$_j$ ← $O_j$, O''$_j$ ← $O_j$
10 |   |   [$\alpha_l$, $\beta_l$] = [$\alpha_j$, $\beta_j$] − [$\alpha_k$, $\beta_k$]
11 |   |   $R_{tmp}$ = $R_{tmp}$ + ([$\alpha_l$, $\beta_l$]:O'$_j$)
12 |   |   for t = 1, 2, . . . , Size(O''$_j$) do
13 |   |   |   if HorizontalOcclusion(o, O''$_j$[t], p, [$\alpha_k$, $\beta_k$]) ∧
       |   |   |   VerticalOcclusion(o, O''$_j$[t − 1], p) then
14 |   |   |   |   Insert o into O''$_j$ at t
15 |   |   |   |   foreach o″ ∈ O''$_j$ ∧ o″ after o do
16 |   |   |   |   |   if VericalOcclusion(o″, o, p) then
17 |   |   |   |   |   |_ Remove o″ from O''$_j$
       |   |   |   |   |_
18 |   |   |   |_ leave loop
       |   |   |_
19 |   |_ $R_{tmp}$ = $R_{tmp}$ + ([$\alpha_k$, $\beta_k$]:O''$_j$)
   |_
20 R = PostProcess($R_{tmp}$)

Assigning Tags to Visible Objects: To generate textual tags for visible objects the object set O retrieved from geo-information sources is utilized, which contain detailed information about the objects, such as name, type, location, address, etc. A sample schema for object information looks as follows:

"id":<Object ID>,
"name":<Object name>,
"type:<Type of the object>,
"coordinates":<Outline of the object>,
"center":<Center point of the object>
"address":<Address of the object>,
"description":<Detailed description of the object>,
"websites":<List of supplementary websites>

In the prototype, the names of visible objects are used to serve as tags. As described in the introduction, location and geographic names play an important role within all types of tags associated with videos and images of media sharing and search sites. Note that the method could be used to further add versatile information to the visible objects, and expand the tag type beyond the geographic domain. For example, the method can incorporate event databases (e.g., Upcoming, http://upcoming.yahoo.com/), and use geo-information and time to extract event-information tags.

Moreover, natural language processing methods can be introduced to generate better and more descriptive tags. In the prototype implementation, if there exists a Wikipedia page for a visible object, this fact is used to upgrade its rank. The content of such pages can be processed in depth to further expand the tags, which is certainly an option in the future.

Scoring and Ranking of Tags

The visual appearance of objects within video scenes can be quite diverse. As an example, an object that is close to the camera would usually be seen clearly, whereas another object which is far away from the camera may be barely recognizable. Consequently, object tags should have different importance or relevance based on how the corresponding object appears in the video scene. Tag ranking is an indispensable process to increase the effectiveness of tags, especially when the tag cardinality is large (e.g., dozens of tags are generated for most of the test videos). Hence the tags need to be prioritized, which in other words means to prioritize the visible objects.

Scoring Tag Relevance for each FOV Scene: The method assess and quantify the relevance of visible objects in an individual FOVScene according to the six relevance criteria below.

Closeness to the FOVScene Center: Research indicates that people tend to focus on the center of an image. Based on this observation, the method favors objects whose horizontal visible angle range is closer to the camera direction, which is the center of the scene, and score it with the formula $$S_1 = 1 - \frac{[\text{middle}([\mu_h v_h]) - d] \times 2}{[\alpha - \beta]}$$

where middle( ) returns the middle angle of the horizontal visible range $[\mu_h, V_h]$.

Distance: A closer object is likely to be more prominent in the video. The score for the distance criterion is formulated as $$S_2 = \min\left\{\frac{1}{\text{distance}(p, \text{center}(o))}, 1\right\}$$

where center( ) returns the coordinate of the object center, and distance( ) computes the distance from the camera to the object center.

Horizontally and Vertically Visible Angle Ranges:

An object that occupies a wider range of the scene (either along the width or height) is more prominent. The normalized scores for these two criteria can be computed with the formulas $$S_3 = \frac{[\mu_h - v_h]}{\theta} \text{ and } S_4 = \frac{[\mu_v - v_v]}{\phi}$$

where $\theta$ and $\phi$ are the horizontal and vertical viewable angles, respectively.

Horizontally and Vertically Visible Percentages:

These two criteria focus on the completeness of the object's appearance in the video. The video scenes that show a larger percentage of an object are preferable over scenes that show only a small part of it. The scoring formulas are $$S_5 = \frac{[\mu_h - v_h]}{\text{width}(o)} \text{ and } S_6 = \frac{[\mu_v - v_v]}{\text{height}(o)}$$

vertically visible angle ranges without occlusion.

After obtaining the scores for each criterion, they are linearly combined to compute the overall score of an object in an individual FOVScene, i.e., $S_{fov} = \Sigma_{i=1}^{6} \omega_i S_i$, where $w_i$ represents the weight to adjust the contribution of each criterion to the overall score. Additionally, the method promotes the scores of well-known objects (or landmarks), which are more likely to be searched for.

The object information retrieved from the geo-information services include several clues to identify important landmarks. For example, in OpenStreetMap data, some landmarks (e.g., the Singapore Flyer) are given an "attraction" label. Others are augmented with links to the Wikipedia pages, which might be an indirect hint for object importance, since something described in Wikipedia is believed to be important.

Association of Tags with Video Segments

Figure 17:
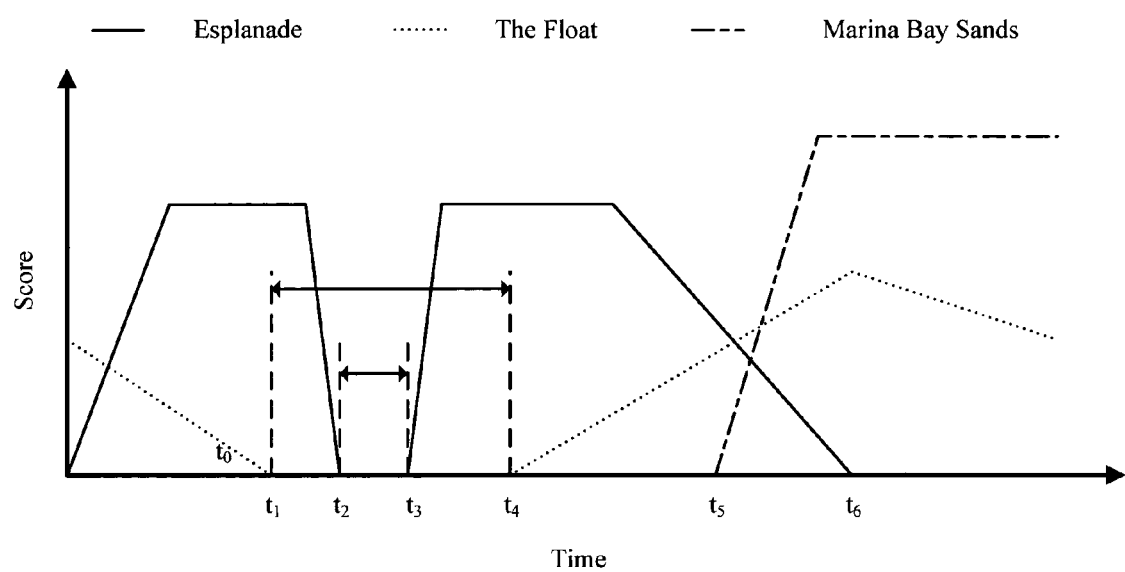
FIG. 17 illustrates temporal continuity of object occurrences.

Due to the Nature of Videos, the Temporal trends of the scores during a period should be explored. FIG. 17 shows an example of score variations over time: the Esplanade receives the top score in the first half while the Marina Bay Sands takes the first place in the second half. These score variations (increase, decrease, reaching a peak or dropping to zero) are caused by the movement and the rotation of the camera. One observation from this example is that a method can determine the segment where an object stays visible by detecting the two boundaries where the score starts from and returns to zero. For example, in FIG. 17 the Esplanade is considered visible from t3 to t6. As an important contribution of the technique it can detect what objects appear in the video as well as when they appear. In other words, a tag can be specifically associated with a certain segment (or segments) of the video. Another observation in FIG. 17 is that the segments [t0, t2] and [t3, t6] are very close to each other. This short time gap between two segments may be caused by camera-shake or some other unexpected actions of the videographer. It may not really disturb human visual perception of continuity. As a further improvement, a threshold is set to merge close segments (e.g., the segments [−, t1] and [t4, +] are too far to be merged), preventing videos from becoming too fragmented. Notably, the segmentation discussed above is logical and dynamic in that the videos are not physically split.

Finally, for each segment associated with an object, its overall scores is calculated. Formally, let $S_{fov}(t)$ denote the score that the object obtains for the FOVScene at time t, and $t^i$ and $t^{\bar{i}}$ respectively denote the start and the end time of the $i^{th}$ segment among the ones where the object appear. Then the score of the object for this segment can be computed through the formula $$S_{seg}^i = \int_{t^i}^{t^{\bar{i}}} S_{fov}(t) dt.$$

All the video segments associated with the object are ranked based on this score. Furthermore, the score of the object can be computed for the whole video via formula $S_{clip} = \Sigma_{i=1}^{n} S_{seg}^t$, where n is the number of the segments associated with the object. Similarly, the objects, or the tags in consequence, can be sorted according to this score.

Figure 18A:
FIG. 18A illustrates a Google Earth interface comprising a visualization of camera trajectory and a top 15 tags identified by an embodiment of a method for automatically generated tags for an example video from Singapore Marina Bay.
Figure 18B:
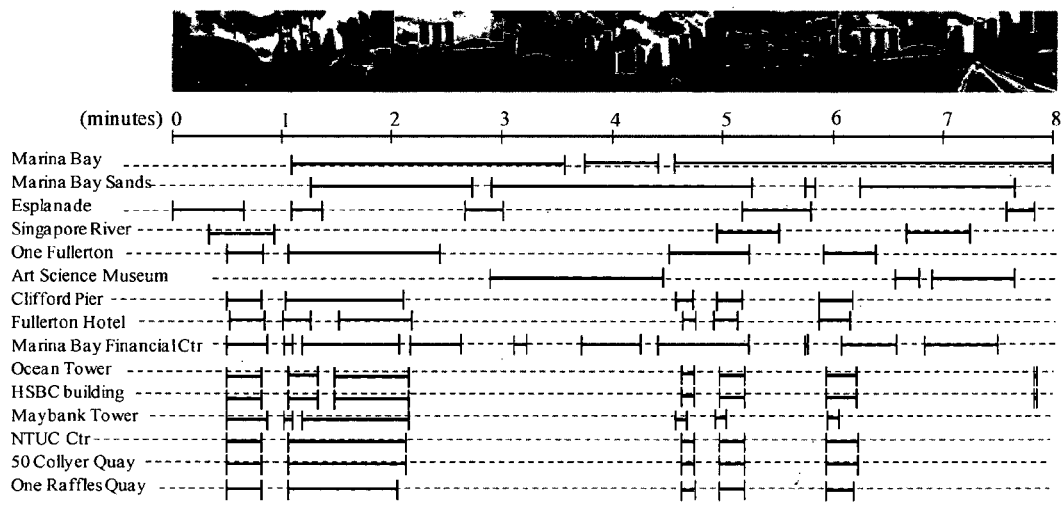
FIG. 18B illustrates a list of video segments where the top 15 tags appear.

FIGS. 18A-B illustrate how multiple regions of interest may be tagged in various parts of a video segment. In this example, the video is taken of an area surrounding Marina Bay in Singapore. FIG. 18A shows a Google Maps view of an example of fifteen regions of interest identifiable in the area of Marina Bay. FIG. 18B shows that the video segment is eight minutes long. FIG. 18B further illustrates the portions of the eight minute segment in which each of the fifteen regions of interest are included in the captured video.

Web Interface for Sensor-Rich Video Automatic Tagging and Search System (SRV-TAGS)

Architecture Overview

Geospatial video acquisition applications have been created for both Android- and iOS-based mobile phones. These applications concurrently acquire location and orientation meta-data from multiple sensors in the phones while recording video. Subsequently, the collected meta-data is used to model the coverage areas of the video scenes as spatial extents, i.e., a camera's set of field of views (FOVs).

Figure 19:
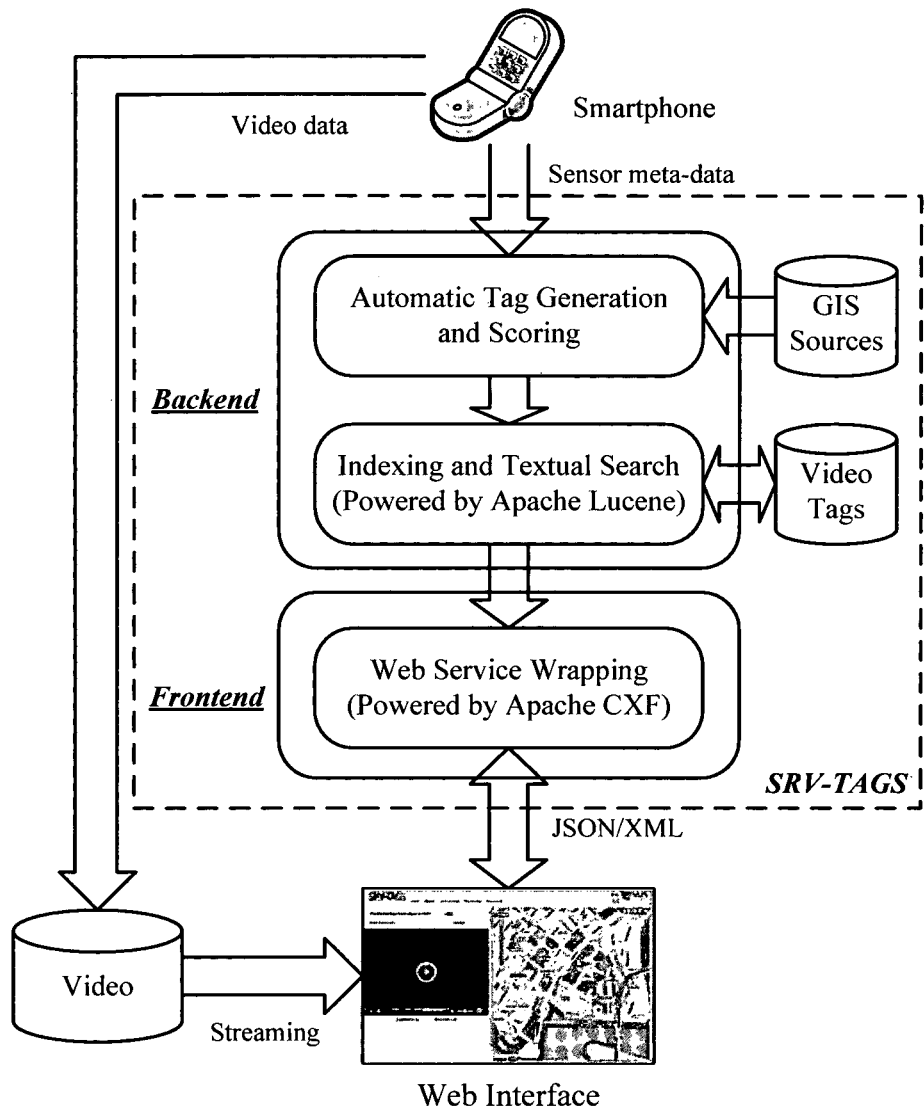
FIG. 19 illustrates an architecture of a sensor-rich video tagging search system.

The acquired sensor data sequences provide a rich source of information which is utilized in the SRV-TAGS system to query existing geo-information databases with the goal of identifying the geographical objects in the viewable region of the video (taking into account occlusions). Subsequently, it extracts textual descriptions of the visible objects to serve as tags, and scores them based on their relevance to the video and the hints provided by the geo-information databases. Notably, SRV-TAGS can accurately associate tags with not only whole video clips but also delimited sub-segments. Then, SRV-TAGS uses the tags to index the videos, leveraging Apache Lucene (http://lucene.apache.org/) to facilitate textual search, and integrating Apache CXF (http://cxf.apache.org/) to expose a programming interface for applications. Finally, the prototype SRV-TAGS system provides a client web interface, where users can search for videos and then watch the results and their coverage visualization on a map. FIG. 19 illustrates the overall architecture. Unlike content-based methods, SRV-TAGS does not analyze video content throughout the procedures.

Automatic Tag Generation and Scoring

One distinguishing feature of SRV-TAGS over prior methods is that it does not rely on analyzing the video content, but instead queries geo-information sources, presently GeoDec and OpenStreetMap (http://www.openstreetmap.org/), in order to acquire the information of geographic objects within the FOVs of the video. Since not all the acquired objects are visible due to occlusions, a 3D visibility checking algorithm is devised to filter out objects that are occluded. Subsequently, SRV-TAGS retrieves the names of the remaining objects to serve as tags.

As SRV-TAGS is prolific in generating multiple tags, it needs to rank them to enhance their utility. Thus, the system leverages multiple relevance criteria to score a tag's (or its corresponding object's) relevance to the video: the object's closeness to the scene center, the distance between the camera and the object location and the visible angle ranges/percentages of the object. Additionally, the scores of popular objects are promoted according to the hints provided by the geo-information sources. Furthermore, the system can determine the start and end timestamps between which the object remains visible. Therefore, SRV-TAGS provides users with answers of delimited video segments, which is especially useful for long videos.

Indexing and Textual Search Support

Given the tags and their relevance scores of the video clips/segments the textual queries from users can be answered. However, the queries may not exactly match the tags because of typos, incompletions, etc. For example, users may expect to retrieve videos showing either "the Fullerton Hotel" or "the One Fullerton" by entering the keyword "Fullerton." Hence, Apache Lucene, a sophisticated full-text search engine, is leveraged to judge the correspondence between the query text and the tags.

When a tag entry (tag name, relevance score, video ID, segment boundaries) is generated, it is fed into the Lucene indexing engine. SRV-TAGS maintains two separate indices: one at the granularity of whole clips and the other at the segment-level. As a query arrives, the tags similar to the query text will be retrieved and sorted according to their Lucene scores. Note that this score is calculated based on the similarity between the query and the tag, while the ranking score reflects the relevance between the tag and the video clip/segment. To calculate the most relevant results, SRV-TAGS first groups all the items by the tags, then sorts the groups by their Lucene score, and finally sorts the items in each group by the ranking score.

Web Service Integration and API

To be easily accessible, SRV-TAGS leverages Apache CXF, a web service framework, to wrap itself as a RESTful service. Three APIs are exposed to potential applications:

Search: Provides the basic functionality of the service. It takes in the query text and produces a list of matched tag entries.

Get: Acquires all the tags of a specific video, and their associated segment details. The input for this function is a video ID.

Add: Allows the adding of a new video into SRV-TAGS. It parses the sensor-data supplied by the recording apps, generates tags, and indexes them. Afterwards, the new video becomes immediately searchable through text queries.

Figure 20:
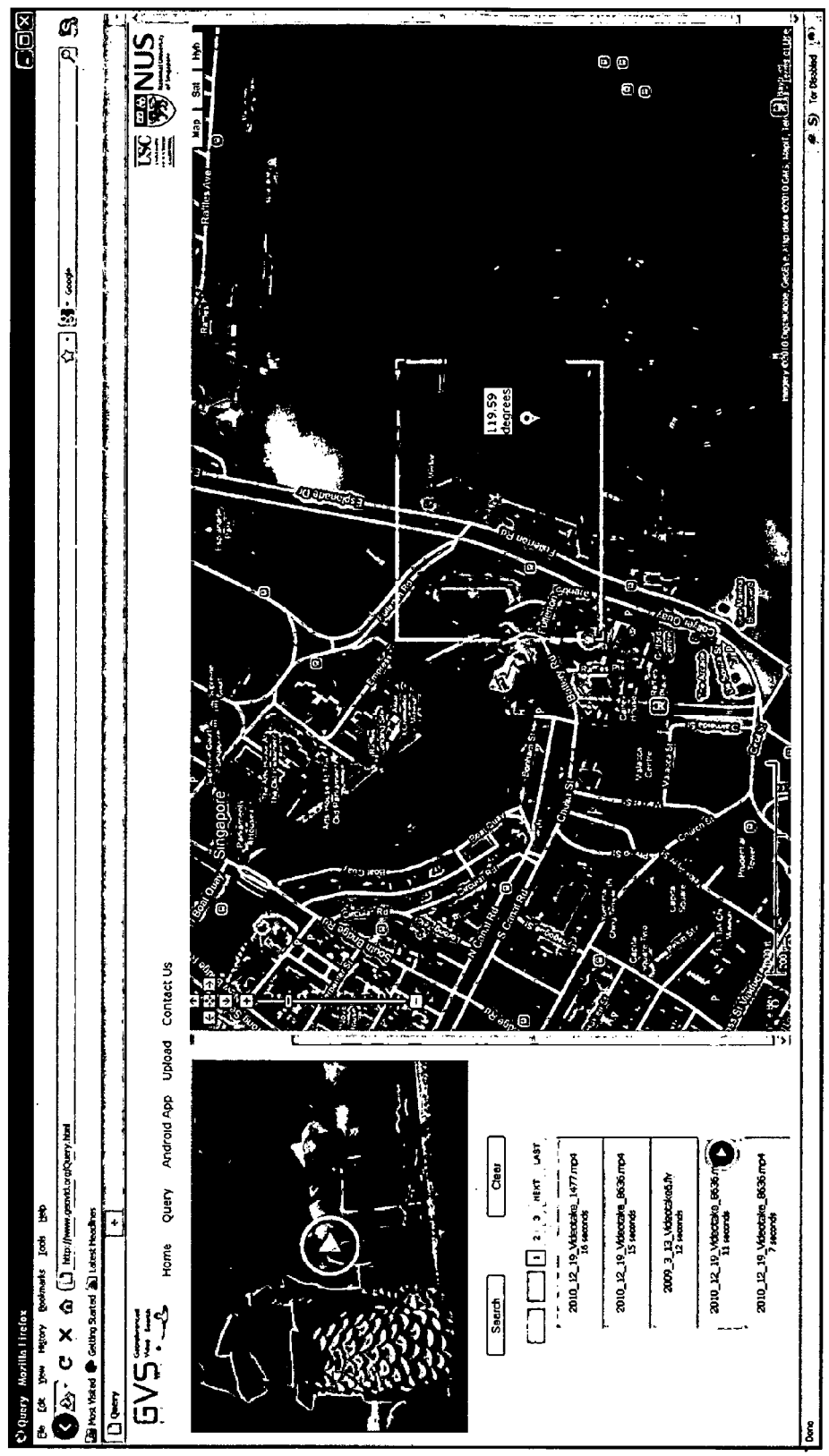
FIG. 20 illustrates a snapshot of a web interface generated according to embodiments of the present methods and systems.

The sensor-data input and the output of the API are organized in JSON or XML format. FIG. 20 illustrates a snapshoot of one embodiment of a web interface that can be generated according to the methods of the present embodiments.

Presentation of Sensor-Rich Videos with Google Earth

Figures 9, 10:
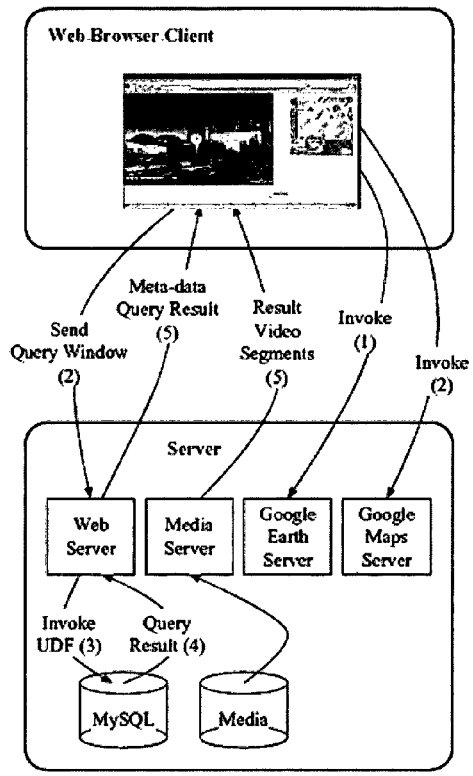
FIG. 9 is a system environment for mobile video management.
FIG. 10 is an architecture of the proposed system.

The objective is to find sensor-rich video segments within a relevant area and then to present them as augmentations in a virtual, three-dimensional environment such as Google Earth. FIG. 9 illustrates the overall architecture of the system. The main components are a browser-based web client, a web server with an associated database, a streaming media server, and remote access to Google's Earth and Maps servers.

The acquisition of videos that are fused with detailed geo-reference information is needed. In order to collect sensor-rich videos with the sensor meta-data, several acquisition prototypes and software applications have been built. FIG. 10 shows an excerpt from the XML-encoded geo-data that is collected by the iPhone application and uploaded to a suitable search engine that provides the backend functionalities. One of the challenges in virtual environments is that it may not be very easy to specify the user's region of interest (i.e., the query area). For example, currently Google Earth does not support the specification of a spatial query rectangle to delineate a search area. For this reason—and because a query area is more naturally expressed in 2D -Google Maps is used to let a user select a query window. The search results are then shown properly placed in Google Earth.

The development environment is based on open source tools and software such as XAMPP (Apache, MySQL, PHP), the Wowza Media Server and the Flowplayer (a video player to render Flash-encoded and other content) and with technologies such as Ajax, IFRAME shim and KML. The Wowza Media Server allows the streaming of video content, similar to the Adobe's Flash media server. Using this combination of media server and player, any segment within a video, specified by start and end timecodes, can be played. This feature is used to extract the most relevant clips from videos which may potentially be very long and cover a large geographical area. The client implementation is browser-based, and hence it is convenient to access from almost anywhere. There are three important components in the system. First, meta-data collection part which is the previous work in the research. Second, the database implementation which contains the 3D meta-data. Third, the Web interface which is the main component in this system. In this part, users can not only search videos through entering a location based rectangle, but also get the query results in the same page.

The meta-data is stored in a MySQL database to allow for efficient access and search. The design can accommodate a variety of sensor meta-data information as is shown in Table 4. FIG. 10 illustrates the data collected on with the iPhone application, however, some other implementations can provide additional information (e.g., altitude, viewable distance). The most significant 3D meta-data in the current system is the heading (in the database, it is the theta attribute), latitude and longitude. The collected 3D data basically represent the camera direction and location as a vector which describes a 3D field-of-view (FOV). Based on this model, videos in the correct positions within the 3D scene view of Google Earth can be shown.

TABLE 4

Schema for 3D field-of-view (FOV) representation.

| filename | Uploaded video file |
|---|---|
| (Plat, Plng) | <Latitude, longitude> coordinate for camera location (read from GPS) |
| altitude | The altitude of view point (read from GPS) |
| theta | Camera heading relative with the ground (read from compass) |
| R | Viewable distance |
| alpha | Angular extent for camera field-of-view |
| tilt | Camera pitch relative with the ground (read from compass) |
| roll | Camera roll relative with the ground (read from compass) |
| ltime | Local time for the FOV |
| timecode | Timecode for the FOV in video (extracted from video) |

In MySQL, the proper functionality is provide through User Defined Functions (UDF) to perform FOV-matching as part of the query execution. The use of UDFs allows us to perform operations on data types that are not natively supported in MySQL. An UDF is executed within the engine of the database, hence being able to take advantage of the execution environment. The UDF was developed and implemented as part of the prior work. One current limitation is that only searches in 2D space are supported. Because of this, the altitude parameter is not implemented. In other words, the search is still performed on the 2D data and the results shown in Google Earth are then displayed as 3D sensor data.

Perspective video, i.e., transforming video from a 2D plane into a projected plane in a 3D virtual space in accordance with the user's viewpoint, is one of the major tasks for web-based video overlapping applications. In this domain, there exist several viable solutions:

Existing plug-in-based Rich Internet Application (RIA) technologies such as Adobe Flash and Microsoft Silverlight support 3D video rendering capabilities. While available for rapid prototyping, these environments re quire overlapped web services to provide corresponding RIA-compatible APIs.

Pixel-level image transformation is also a feasible solution, but it requires significant client-side processing power.

A Cascaded Style Sheets (CSS) 3D transform has been proposed by Apple Inc., and it is now under development by the W3C CSS level 3. This method transforms the coordinate space of a video element through a simple change of its transform properties.

An IFRAME shim can establish a layer on top of the Google Earth web browser plug-in (or other web pages). The IFRAME can aid in the process of rendering videos, and is flexible in any environment.

Considering both practicality and feasibility, the IFRAME shim approach is chosen as the main technique to overlay 3D perspective video. Hence, when the viewing direction changes by a certain angle, the video also changes accordingly. With this notion, the users will get a more intuitive and immersive experience. Additionally, the meta-data will be stored in a KML file which allows to automatically invoke an animated the through Google Earth. This is a relatively new capability of Google Earth which can help us automatically traverse the environment. Furthermore, the camera trajectory will also be shown in the 3D world. With the presentation of the trajectory, the users will explicit In Google Earth, the number of modeled 3D buildings varies among different cities, but overall the number is steadily increasing. When 3D building structures exist, the captured video can be more convincingly overlaid with the virtual world. When viewing these buildings, it is determined whether the scene in a video matches the same position in the virtual world. It can also observed how accurate the these 3D buildings have been modeled. Note that due to the current limitation of Google Earth, which does not allow the drawing of dynamic rectangles, Google Maps are used to enter the query region by applying the Google API. Therefore, the query mode is currently 2D, which may be extended in the future. There are also a number of other technologies used for the web interface. To embed Google Earth and Google Maps in the same web page, Ajax may be used. To achieve the interaction between Google Earth and Google Maps interfaces, the google.earth namespace, the GEView interface, and the Maps API GPolygon are used. The specific details of each technology are given below.ly follow the camera movement associated with the video.

The google.earth namespace contains global functions to support to the use of the Earth API interfaces. A listener may be attached to Google Earth for a specific event, which means that if Google Earth moves, the program will be aware of the movement and simultaneously move Google Maps.

The GEView interface checks the view behavior of the observer camera in Google Earth. There is a function that can return the global view region that is visible. It is noteworthy that the returned region may not be very accurate because it will be larger than what is strictly visible.

Maps API GPolygon is an interface to create a polygon in Google Maps. Through this the users will directly get a view of the query region.

Figure 21:
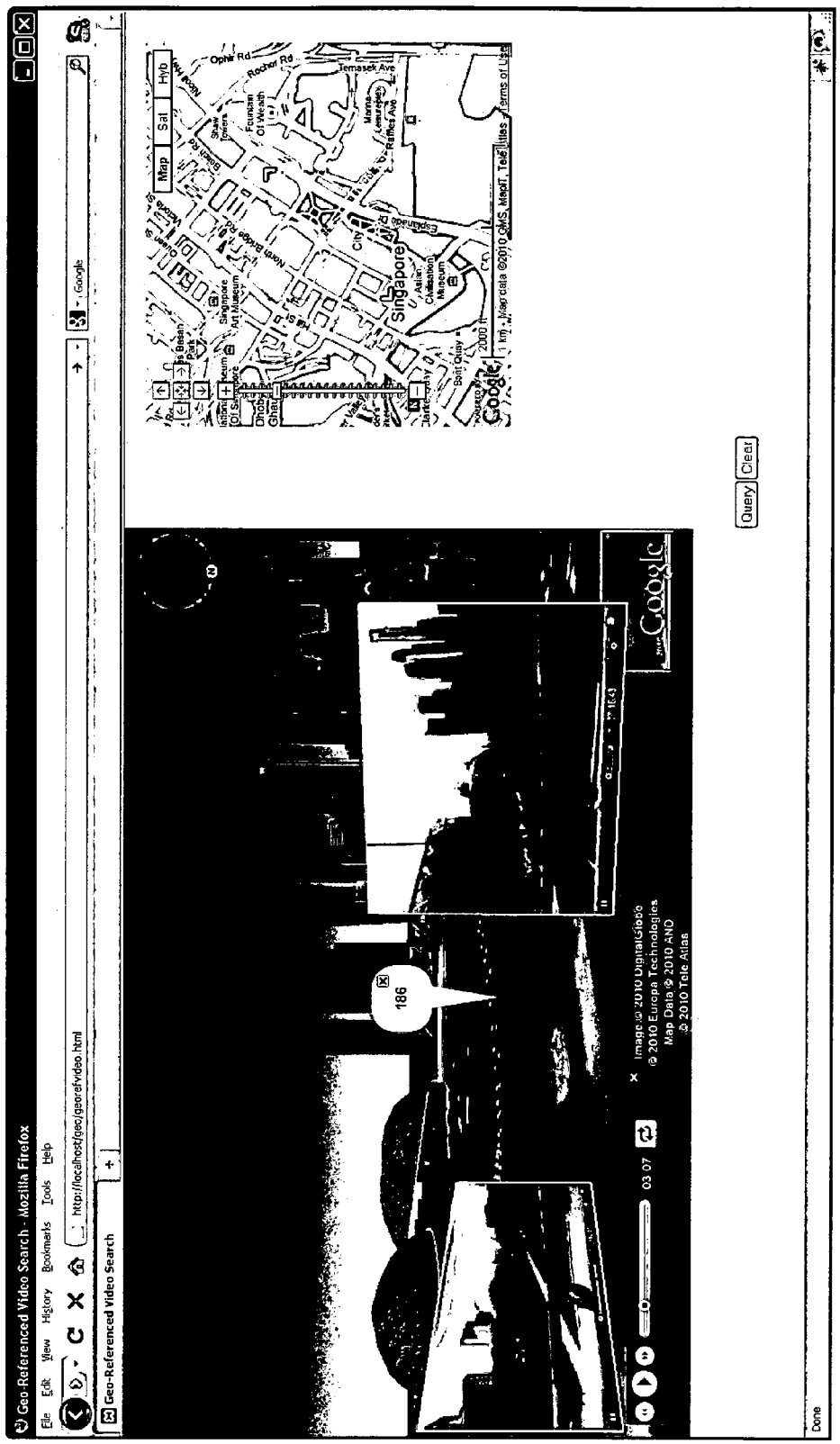
FIG. 21 illustrates sensor-rich video search results rendered in Google Earth.

FIG. 21 shows the video results using the example Sensor-rich video Search engine. As can be seen, the web browser interface embeds Google Earth and Google Maps on the same page. Superimposed on top of Google Earth are the video results, while in the lower left bottom is the progress bar. The indicator on the progress bar points out the corresponding position within the time interval.

In the system, data needs to be exchanged between the clients and server corresponding to the query and result data. The overall architecture is shown in FIG. 9. The numbers (1) through (5) indicate the sequence of interactions between a client and the server. Initially the user sends a query window to the server. There, the data will be processed by means of using PHP to invoke the UDF then returning the query results to the PHP code. The query results contain a KML file and video clip information which is used to play back the video clips from the media server. Finally, the results will be sent to the user where they are shown in Google Earth.

The main functionality in this client-server interaction is coded with Ajax. With this technology, web applications can retrieve data from the server asynchronously without interfering with the display and behavior of the existing page. At the same time, because of the properties of Ajax, an dynamic interface can be established for the web page.

A prototype sensor-rich video acquisition module was designed and implemented on an Apple iPhone 3GS handset, which provides the built-in GPS receiver and compass functionality.

The Sensor-rich video App was developed with Apple's Xcode development environment for iPhone OS version 3.1.2 or later. The Sensor-rich video App is composed of six functional modules: (1) video stream recorder, (2) location receiver, (3) orientation receiver, (4) data storage and synchronization control, (5) data uploader and (6) battery status monitor.

Video Stream Recorder:

This module employs the UIKit Framework of the iPhone OS Cocoa Touch Layer to invoke the built-in camera. Among the three video formats that the iPhone supports, the medium quality profile is used. However, this could be changed based on user needs. Table 5 summarizes the audio and video acquisition parameters.

TABLE 5 iPhone audio/video capture parameters.

| Parameter | Description | |
|---|---|---|
| Format | MPEG-4 | |
| Format profile | QuickTime | |
| Overall bit rate 861 Kbps | 861 Kbps | |
| | Video | Audio |
| Format | AVC | AAC |
| Format profile | Baseline@L3.0 | LC |
| Bit rate mode | Variable | Constant |
| Bit rate | 794 Kbps | 64.0 Kbps |
| Resolution | 24 bits | 16 bits |
| Resolution (pixels) | 640 × 480 | |
| Aspect ratio | 4:3 | |
| Frame rate | 30 fps | |
| Frame rate mode | Variable | |
| Colorimetry | 4:2:0 | |
| Scan type | Progressive | |
| Channel(s) | | 2 channels |
| Sampling rate | | 44.1 KHz |

Location and Orientation Receiver:

To engage and control the built-in GPS receiver and magnetometer, the Core Location Framework in iPhone OS Core Services Layer is used. Location data consists of longitude and latitude and the position can be regarded as the mobile phone exactly as the position of the camera. For the orientation information, however, an interesting difference between the true pointing direction and the device heading is discovered. Therefore, the system also fetches the accelerometer data from the UIKit Framework to determine an adjustment and ensure that the data that is recorded represents the camera's direction, even when the phone is held vertically.

An interesting aspect in sensor data acquisition is the sampling frequency. The update frequency may be set based on a distance filter for the location data and a fixed sample rate for the orientation information. A location update is triggered whenever a distance movement of more than 10 meters is detected. The sampling rate for the compass is set to 30 per second. Experimentally, with these settings viewable scene changes may be discovered well while saving battery energy as much as possible. Furthermore, an expiration deadline is set for every data item obtained. If the location coordinates were obtained longer than 5 seconds ago, this data is considered as stale. For orientation data, its lifetime is set to 2 seconds because of its higher variability.

Data Storage and Synchronization Control:

This module manages the storage of the sensor data on the device's flash disk. The goal is to utilize a flexible data format that can be easily ingested at a server. In this situation a Property List may be chosen in the Core Data Framework as the structured data representation. The Property List provides an XML-based abstraction for expressing simple hierarchies of data.

To provide synchronization, the duration, encoded date and time is extracted from the video via the MOV multimedia framework. Timestamp information is then added to every sensor data record to establish the relationship between a video clip and its corresponding geo-sensor information. Time is represented in Greenwich Mean Time (GMT), to avoid time zone issues. Files include the timestamp as part of their filename to allow for easy disambiguation.

Data Uploader; This module employs an open source wrapper around the CFNetwork API in iPhone OS Core OS Layer, named ASIHTTPRequest. This third-party class makes some of the more tedious aspects of communicating with a web servers easier and it is suitable for performing basic HTTP requests and interacting with REST-based services (GET/POST/PUT/DELETE). The Data Uploader transparently utilizes Wi-Fi, 3G or 2G cellular networks to transmit data files. Importantly, this module implements the two different strategies: (1) both video and sensor files are uploaded concurrently and (2) only the sensor files are uploaded first, while the video files may be transmitted later. Video files on the flash disk are tagged whether they still need to be uploaded.

Figure 22A:
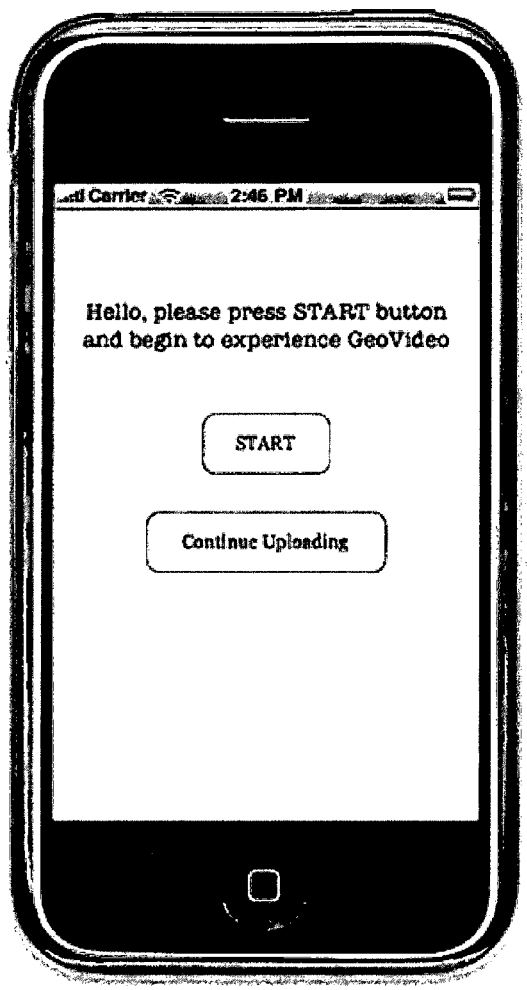
FIGS. 22A-B illustrate a sensor-rich video iPhone application prototype.
Figure 22B:

FIGS. 22A-B show two screenshots of the Sensor-rich video App. When the user launches the software, he or she will first see a welcome view (left side of FIG. 22A). A user can either choose to start capturing a new video, or continue to upload video clips whose sensor data was previously uploaded. If the user touches the START button, a camera viewfinder will be displayed (FIG. 22B right) and the user can then record, stop, cancel or edit a video clip via this interface just like they usually do in the iPhone's default camera view. However, the system additionally starts to record geo-referenced information from the GPS and the digital compass. The sensor data is stored to the device at the time when the video is saved to the camera roll and flash disk. Next, an uploading screen guides the user through the next step. A destination URL is displayed (which can be changed) and either the sensor information only or both the sensor and video files can be uploaded. As mentioned earlier, saved videos can be uploaded at a later point in time directly from the welcome screen.

Methods for automatically positioning and displaying videos in 3D environments are disclosed. First, the acquired sensor data in the case was not using the same coordinate system as Google Earth or Google Maps. Therefore, the data needs to be converted so that it is compatible with systems such as Google Earth. The experimental GPS sensor data information is based on a format of degrees, minutes, and seconds. However, the longitude and latitude in Google Earth uses a decimal degree format as represented by the WGS84 coordinate system. The broader issue here is that multiple coordinate systems need to be supported and data needs to be correctly identified and converted to support large-scale video acquisition and applications.

Second, sensor values by their very nature are sometimes noisy and errors and drop-outs may occur in practice at times. This problem of data quality will require further study, for example, to investigate interpolation and error correction methods. Another issue may be the accurate registration of 3D buildings in Google Earth (or other virtual worlds). Furthermore, the 3D datasets are far from complete and only a few cities have extensive 3D structures in Google Earth. When buildings are missing then naturally there will be a visual mismatch between any video and the 3D world in that area. This may disrupt a user's navigational experience.

Third, as mentioned earlier, current display technology is mostly 2D and this makes it difficult for the user to specify a 3D query region through, for example, mouse interactions. In the prototype, Google Maps is used to aid in the query area definition, but eventually a full 3D query input would be desirable.

Finally, there is the practical challenge of overlaying videos on an application such as Google Earth. Some interfaces exist to deal with images and videos. Although they have rudimentary support for geo-location information, they are still not suitable for the research. For example, existing applications in Google Earth only show YouTube videos which are specified by some URL information. More flexibility is helpful for the selection of the IFRAME shim method instead using the Google API. In addition, the system uses the own media server which can manipulate the source video clips by extracting segments, or perform other operations. A current limitation is related to 3D perspectives. With the technology of IFRAME shim under Mac OSX, 3D perspectives may be implemented in Google Earth with the latest webKit.

In the prototype system, it is demonstrated that the automatic placement of videos into the three-dimensional coordinate system of Google Earth and the result is very promising. There exist some challenges that still need to be overcome, such as the sensor accuracy of the collected dataset because of weather conditions and other environmental effects. However—very significantly—most of the data can be placed well and fully automatically in the experiments. For large-scale datasets such an automatic processing is of critical importance.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention as defined by the appended claims.

What is claimed is:

1. A method comprising:
obtaining information at an electronic device, the information comprising:
an absolute location of the electronic device defined by latitude, longitude, and altitude of the electronic device obtained via a global positioning system;
an absolute direction of the electronic device relative to North that a surface of the electronic device points to;
a level of light that the electronic device is exposed to; and
an acceleration of the electronic device's motion; and
recording the obtained information from the group consisting of location, direction, level of light, and acceleration as meta-data in conjunction with multimedia data to create sensor-rich multimedia;
wherein the information is continuously obtained at a first rate, and the information is continuously recorded at a second rate and the method further comprising determining whether the first rate matches the second rate and, if the first rate is lower than the second rate, calculating data values for the information when at an information recordation time, no information is obtained.

2. The method of claim 1, wherein the information is recorded in a video format.

3. The method of claim 1, further comprising associating the information with a time reference.

4. The method of claim 3, wherein associating the information with a time reference comprises associating measurement time of the location, direction, level of light, and acceleration information.

5. The method of claim 1, wherein the calculation of data values uses information obtained prior to the recordation time and information obtained after the recordation time.

6. The method of claim 1, further comprising:
determining an accuracy of the information at a recordation time; and
recalculating a value for the information, if the information is inaccurate.

7. The method of claim 6, wherein the accuracy of the information at a recordation time is determined by information obtained prior to the recordation time and after the recordation time.

8. The method of claim 1, further comprising identifying target information from the continuously recorded information.

9. The method of claim 8, further comprising extracting the target information from the continuously recorded information.

10. The method of claim 1, further comprising identifying a target object in the continuously recorded information.

11. The method of claim 10, further comprising calculating a visible distance from the electronic device to the target object.

12. An electronic device, the electronic device configured to:
continuously obtain information, the information comprising:
an absolute location of the electronic device defined by latitude, longitude, and altitude of the electronic device obtained via a global positioning system;
an absolute direction of the electronic device relative to North that a surface of the electronic device points to;
a level of light that the electronic device is exposed to; and
an acceleration of the electronic device's motion; and
continuously record the obtained information from the group consisting of location, direction, level of light, and acceleration as meta-data in conjunction with multimedia data to create sensor-rich multimedia;
wherein the information is continuously obtained at a first rate, and the information is continuously recorded at a second rate and the electronic device is configured to determine whether the first rate matches the second rate and to calculate data values for the information when at an information recordation time, no information is obtained when the first rate is lower than the second rate.

13. The electronic device of claim 12, wherein the information is recorded in a video format.

14. The electronic device of claim 12, further configured to associate the information with a time reference.

15. The electronic device of claim 14, wherein associating the information with a time reference comprises associating measurement time of the location, direction, level of light, and acceleration information.

16. The electronic device of claim 12, wherein the calculation of data values uses information obtained prior to the recordation time and information obtained after the recordation time.

17. The electronic device of claim 12, further configured to:
determine an accuracy of the information at a recordation time; and
recalculate a value for the information when the information is inaccurate.

18. A The electronic device of claim 17, wherein the accuracy of the information at a recordation time is determined by information obtained prior to the recordation time and after the recordation time.

19. The electronic device of claim 12, further configured to identify target information from the continuously recorded information.

20. The electronic device of claim 19, further configured to extract the target information from the continuously recorded information.

21. The electronic device of claim 12, further configured to identify a target object in the continuously recorded information.

22. The electronic device of claim 21, further configured to calculate a visible distance from the electronic device to the target object.

23. A system comprising:
a location sensor configured to measure an absolute location defined by latitude, longitude, and altitude location of the system obtained via a global positioning system;
a direction sensor configured to measure an absolute direction relative to North of the system;
a light sensor configured to measure a level of light that the system is exposed to;
an accelerometer configured to measure an acceleration of the system's motion; and
a recording device configured to continuously record obtained information from the group consisting of location, direction, level of light and acceleration as meta-data in conjunction with multimedia data to create sensor-rich multimedia;
wherein during use the information is continuously obtained at a first rate, and the information is continuously recorded at a second rate and the system is configured to determine whether the first rate matches the second rate and to calculate data values for the information when at an information recordation time, no information is obtained when the first rate is lower than the second rate and the calculation of data values uses information obtained prior to the recordation time and information obtained after the recordation time.

24. The system of claim 23, wherein the information is recorded in a video format.

25. The system of claim 23, further configured to associate the information with a time reference.

26. The system of claim 25, wherein associating the information with a time reference comprises associating measurement time of the location, direction, level of light, and acceleration information.

27. The system of claim 23, further configured to:
determine an accuracy of the information at a recordation time; and
recalculate a value for the information when the information is inaccurate.

28. The system of claim 27, wherein the accuracy of the information at a recordation time is determined by information obtained prior to the recordation time and after the recordation time.

29. The system of claim 23, further configured to identify target information from the continuously recorded information.

30. The system of claim 29, further configured to extract the target information from the continuously recorded information.

31. The system of claim 23, further configured to identify a target object in the continuously recorded information.

32. The system of claim 31, further configured to calculate a visible distance from the electronic device to the target object.

* * * * *